(12) United States Patent
Liu et al.

(10) Patent No.: US 11,444,314 B2
(45) Date of Patent: Sep. 13, 2022

(54) HIGH-ENERGY-DENSITY SECONDARY LITHIUM-ION BATTERY

(71) Applicant: National Engineering Research Center of Advanced Energy Storage Materials (Shenzhen) Co., Ltd, Shenzhen (CN)

(72) Inventors: Hongbing Liu, Shenzhen (CN); Faping Zhong, Shenzhen (CN); Xiaofeng Chen, Shenzhen (CN); Pengfei Chen, Shenzhen (CN); Yinglin Gong, Shenzhen (CN); Shunhua Hu, Shenzhen (CN)

(73) Assignee: NATIONAL ENGINEERING RESEARCH CENTER OF ADVANCED ENERGY STORAGE MATERIALS (SHENZHEN) CO., LTD, Shenzhen (CN)

( * ) Notice: Subject to any disclaimer, the term of this patent is extended or adjusted under 35 U.S.C. 154(b) by 416 days.

(21) Appl. No.: 16/742,474

(22) Filed: Jan. 14, 2020

(65) Prior Publication Data
US 2021/0013540 A1    Jan. 14, 2021

(30) Foreign Application Priority Data
Jul. 10, 2019 (CN) .......................... 201910617733.2

(51) Int. Cl.
*H02J 7/00* (2006.01)
*H01M 10/44* (2006.01)
*H01M 10/0525* (2010.01)

(52) U.S. Cl.
CPC ....... *H01M 10/0525* (2013.01); *H02J 7/0013* (2013.01); *H02J 7/0063* (2013.01); *H01M 10/441* (2013.01)

(58) Field of Classification Search
CPC ... H01M 10/0525; H02J 7/0013; H02J 7/0063
USPC ......................................................... 429/163
See application file for complete search history.

(56) References Cited

U.S. PATENT DOCUMENTS 8,071,233 B2 * 12/2011 Partin ................. H01M 50/116
429/57
11,158,887 B2 * 10/2021 Liu .................... H01M 50/1245

\* cited by examiner

*Primary Examiner* — Michael R. Fin
(74) *Attorney, Agent, or Firm* — Muncy, Geissler, Olds & Lowe, P.C.

(57) ABSTRACT

The present invention provides a high-energy-density secondary lithium-ion battery, including: a lithium-ion cell, a steel shell, a protection IC, an integrated IC, resistors, capacitors, an inductor, a MicroUSB interface, a plastic structural part, a square rigid FR-4 substrate, a circular rigid FR-4 substrate and a metal cap, for integrating three functions of a constant voltage output, charge management and protection, overcharge and overdischarge protection, and overcurrent protection. Compared with the prior art, the large-capacity secondary battery of the present invention can achieve multi-functional integration of the battery, and also can save the space occupied by accessory structural parts of the battery and achieve a high energy density of the battery, and is also conducive to improving the reliability.

9 Claims, 10 Drawing Sheets

HIGH-ENERGY-DENSITY SECONDARY LITHIUM-ION BATTERY

FIELD OF THE INVENTION

The present invention relates to a high-energy-density secondary lithium-ion battery, in particular to a secondary rechargeable lithium-ion battery that integrates multiple functions of a constant voltage output, a MicroUSB interface, charge management and charge protection, and battery protection (including overcharge protection, overdischarge protection, and overcurrent protection), and has a high energy density.

BACKGROUND OF THE INVENTION

With the development of secondary lithium-ion battery technology, the performance of secondary lithium-ion batteries has been improved rapidly, and the cost thereof has also dropped significantly. Secondary lithium-ion batteries have the advantages of a high energy density and a long life, and thus are applied more and more widely. At present, secondary lithium-ion batteries have become the main power supply batteries for mobile phones, notebook computers, cameras and portable mobile power packs, and in many traditional application fields of primary batteries such as for remote controls, flashlights, toys, etc., secondary lithium-ion batteries are also gradually replacing the primary batteries.

However, compared with a primary battery, a secondary battery still has much inconvenience in use. The primary battery does not need to be charged, while the secondary lithium-ion battery needs to be charged with a dedicated charger, and to maintain normal performance, the secondary lithium-ion battery needs to manage and protect the charging process and the discharging use process. The rated voltage of the primary battery is different from that of the secondary lithium-ion battery. For example, the rated voltage of a lithium cobaltate-graphite type lithium-ion secondary battery is 3.7V, while the rated voltage of a general alkaline zinc-manganese dry battery is 1.5V.

Thus, if voltage management is not performed on the secondary lithium-ion battery, generally it cannot be directly applied to an electrical device using the primary battery. Otherwise, the electrical device may be damaged.

To use a secondary lithium-ion battery in place of a primary battery, it often needs integrated assembly of a cell and accessory structural parts (generally including a circuit board, circuit components, a protective case, various interfaces, etc.) of the secondary lithium-ion battery, to finally form such a secondary lithium-ion battery that have various management and protection functions, with an output voltage meeting the requirement of a primary battery application, and overall outer structural dimensions and mechanical reliability of the battery meeting international standards. However, in the existing method for arranging accessory structural parts, usually a large amount of internal space of the battery is occupied thereby, so that it can only use a small-size low-capacity cell, which results in that the integrated secondary lithium-ion battery's energy density advantage is not obvious yet as compared with the primary battery.

Therefore, it has become very necessary to combine the performance characteristics of the secondary lithium-ion battery with the use requirements of the primary battery, overall optimize the charge management and protection of the secondary battery, the outer structure of the primary battery, and the use requirements of the primary battery, and minimize the space occupied by the accessory structural parts and leave more space for the cell to increase the energy density of the entire lithium-ion battery, while taking into account the integration cost, efficiency and reliability.

SUMMARY OF THE INVENTION

A technical problem to be solved by the present invention is to overcome the above-mentioned drawbacks in the prior art and provide a high-energy-density secondary lithium-ion battery.

Compared with the prior art, the energy density of the secondary lithium-ion battery of the present invention can be increased by about ⅓, and can achieve a constant output voltage during the power output operation of the battery, and also has charge management and protection, discharge undervoltage protection, charge overvoltage protection, charge overcurrent protection, discharge overcurrent protection, short circuit protection and a MicroUSB interface. The secondary lithium-ion battery is very suitable for application scenarios where a rechargeable battery is used in place of a primary battery.

The present invention is achieved by the following solution:

A high-energy-density secondary lithium-ion battery comprising a lithium-ion cell, a steel shell, a protection IC, an integrated IC (integrating a charge function and a constant voltage output function), resistors, capacitors, an inductor, a MicroUSB interface, a plastic structural part, a square rigid FR-4 substrate, a circular rigid FR-4 substrate and a metal cap, for integrating three functions of a constant voltage output, charge management and protection, overcharge and overdischarge current protection, overcurrent protection and in a form of three-dimensional space layout and assembly, greatly reducing the space occupied by structural parts that do not contribute to the capacity, to achieve a high energy density, wherein the MicroUSB interface is welded to a side A of the square rigid FR-4 substrate; the protection IC, the integrated IC, the resistors, the capacitors, the inductor and the metal cap are welded to the circular rigid FR-4 substrate; a side B of the square rigid FR-4 substrate is perpendicularly assembled with the circular rigid FR-4 substrate, an opening of the MicroUSB interface being oriented the same as a side A of the circular rigid FR-4 substrate, and pads on the side B of the square rigid FR-4 are soldered and fixed to pads on a side B of the circular rigid FR-4 substrate; the lithium-ion cell is placed inside the steel shell; the metal cap is clamped in the plastic structural part and partially exposed from an end face of a first tensile body of the plastic structural part; the square rigid FR-4 substrate and the circular rigid FR-4 substrate assembled together are clamped on the plastic structural part in a mating manner with the opening of the microUSB interface facing upward; the plastic structural part is sleeved at an open end of the steel shell in a mating manner; and a positive terminal and a negative terminal of the lithium-ion cell are connected to a first pad and a second pad on the side B of the circular rigid FR-4 substrate through a positive electrode lead wire and a negative electrode lead wire respectively;

The metal cap includes three cylindrical bodies, namely a first cylindrical body, a second cylindrical body and a third cylindrical body, wherein the first cylindrical body has a diameter M1 and a height H1, an upper end surface of the first cylindrical body being chamfered, the height H1 being a protruding height of the whole cap of the secondary lithium-ion battery, and the first cylindrical body being a structural part for the secondary lithium-ion battery to contact an external load or charging power source; and the second cylindrical body of the metal cap has a diameter M2 and a height H2, the second cylindrical body being coaxial with the first cylindrical body; a top surface of the second cylindrical body is coplanar with a bottom surface of the first cylindrical body; M2<SHD<M1 and 0.5 mm≤M2≤3 mm; and the height H2 satisfies: SJ1+YJmax≤H2 and SJ1+SJ2−0.8 mm≤H2≤SJ1+SJ2−0.2 mm, wherein SJ1 is the height of the first tensile body of the plastic structural part, YJmax is the height of the highest component on the side A of the circular rigid FR-4 substrate, that is, the side directly facing the first cylindrical body of the metal cap, and SJ2 is the height of the second tensile body of the plastic structural part, SD1 is the diameter of the first tensile body of the plastic structural part, and SHD is the diameter of a central hole of the plastic structural part, all in mm. The setting of lower limit of M2 can ensure the metal cap has certain strength and can well support a pressing contact force from the outside; and the setting of the upper limit of M2 can reduce an internal space of the battery occupied by the metal cap, thereby leaving more space for the side A of the circular rigid FR-4 substrate to arrange circuit components. The setting of the lower limit of the height H2 can fully meet the assembly requirement of the circular rigid FR-4 substrate after surface mounting and the metal cap and the plastic structural part, without interference; and the setting of the upper limit of the height H2 can reduce the battery space occupied by the metal cap, the plastic structural part and the circular rigid FR-4 substrate after assembly, thus leaving more space for the large-size high-capacity cell.

The third cylindrical body of the metal cap has a diameter M3 and a height H3; the third cylindrical body is coaxial with the second cylindrical body; a top surface of the third cylindrical body is coplanar with a bottom surface of the second cylindrical body; M3<M2 and 0.1 mm≤M3≤1 mm; and the height H3 satisfies: YH+0.2≤H3≤YH+2 mm and YH+SJ1+SJ2≤H3+H2≤YH+SJ1+SJ2+2 mm, wherein YH is the thickness of the circular rigid FR-4 substrate, in mm. The setting of lower limit of M3 can ensure the metal cap has certain strength after soldered connection with the circular rigid FR-4 substrate and can well support a pressing contact force from the outside; and the setting of the upper limit of M3 can reduce an internal space of the battery occupied by the metal cap, thereby leaving more space for the side B of the circular rigid FR-4 substrate to arrange circuit components. The setting of the lower limit of the height H3 can fully meet the assembly process requirements of soldering the metal cap to the side B of the circular rigid FR-4 substrate through the third cylindrical body; and the setting of the upper limit of the height H3 can reduce the battery space occupied in the height direction by the metal cap, the plastic structural part and the circular rigid FR-4 substrate after assembly, thus leaving more space for the large-size high-capacity cell.

The joint limitation of the height H2 and the height H3 of the metal cap can achieve that the first cylindrical body of the metal cap is tightly clamped at a top end of the first tensile body of the plastic structural part, and the circular rigid FR-4 substrate is tightly clamped at a bottom end of the second tensile body of the plastic structural part, and both the metal cap and the circular rigid FR-4 substrate can be stably fixed to meet the requirements of mechanical properties such as battery vibration and fall.

The plastic structural part includes the first tensile body and the second tensile body, the first tensile body being a cylindrical structure, wherein the diameter SD1 of the first tensile body of the plastic structural part is equal to the outer diameter GW of the steel shell, and the height of the first tensile body is SJ1=0.5-1 mm (if the height SJ1 is too small, the strength is not enough, so SJ1 is larger than or equal to 0.5 mm; and if the height SJ1 is too large, the height space of the battery is occupied, so SJ1 is smaller than or equal to 1 mm); and the first tensile body is provided with a center hole, the diameter SHD of which satisfies: M2<SHD<M1 (the diameter of the hole is smaller than M1, so that the first cylindrical body of the metal cap is clamped above the center hole, and the pressing contact force from the outside of the battery is transmitted to the plastic structural part through the first cylindrical body of the metal cap, and the plastic structural part is supported on the steel shell, so the force externally applied to the metal cap is mostly borne by the steel shell of the battery, thus avoiding that the force is applied to the circular rigid FR-4 substrate and its circuits and circuit components, the cell, the square rigid FR-4 substrate and its circuits, inside the battery, which is beneficial to improving the overall reliability and safety of the battery).

The first tensile body of the plastic structural part is provided with a hollowed MicroUSB opening portion, the opening dimensions of which are matched with the dimensions of the MicroUSB.

The second tensile body is a cylindrical structure, one end of the second tensile body being perpendicularly fixed to the bottom of the first tensile body, and the second tensile body being coaxial with the first tensile body. The outer diameter SD2 of the second tensile body satisfies: GN−0.5 mm≤SD2≤GN, wherein GN is the inner diameter of the steel shell; and the wall thickness SDB of the second tensile body is 0.5-1 mm (if the thickness SDB is too small, the strength is not enough, so SDB is larger than or equal to 0.5 mm; and if the thickness SDB is too large, the space in the diameter direction of the battery is occupied, so SDB is smaller than or equal to 1 mm). The dimensional setting of SD2 can fully meet the requirement that the plastic structural part projects into the steel shell of the battery through the second tensile body, and is clamped through the first tensile body of the plastic structural part, so there is SD2≤GN; moreover, to fully reserve the space to the circular rigid FR-4 substrate and the square rigid FR-4 substrate, there is GN−0.5 mm≤SD2.

The height SJ2 of the second tensile body of the plastic structural part satisfies: YJmax≤SJ2≤YJmax+1 mm, wherein YJmax is the height of the highest component on the side A of the circular rigid FR-4 substrate, that is, the side directly facing the first cylindrical body of the metal cap. The dimensional setting of YJmax≤SJ2 can ensure the circular rigid FR-4 substrate after surface mounting can be well assembled with the plastic structural part without interference. SJ2≤YJmax+1 mm is set in full consideration of saving the space required for parts that do not contribute to the capacity, and minimizing the height space of the battery occupied by the plastic structural part, thereby leaving the saved height space to the cell, which is conducive to a high energy density of the battery.

The square rigid FR-4 substrate includes a first square flat plate tensile body and a second square flat plate tensile body, the first square flat plate tensile body being combined with the second square flat plate tensile body into a whole, and two hollowed square slots symmetrical about a central axis being formed at a joint part of the first square flat plate tensile body and the second square flat plate tensile body. The height FCG of the square slots satisfies: YH<FCG<YH+

0.2 mm (YH<FCG can fully meet the requirement of assembling the circular rigid FR-4 substrate and the square rigid FR-4 substrate through the hollowed square slots; FCGYH+ 0.2 mm can satisfy that after the circular rigid FR-4 substrate and the square rigid FR-4 substrate are assembled, it also needs soldering to achieve circuit connections between the pads J4 and J5, and between the pads J6 and J7, and if FCG is too large, the implementation of the soldering process is affected), wherein YH is the thickness of the circular rigid FR-4 substrate, in mm; the width FCKD of the square slots is 0.5-2 mm (the setting of the width FCKD of the square slots can meet the strength requirement of the clamped assembly of the circular rigid FR-4 substrate and the square rigid FR-4 substrate, and also can meet the requirement of surface mounting of the MicroUSB interface to the square rigid FR-4 substrate; if the width FCKD of the square slots is too small, the strength is insufficient; and if the width FCKD of the square slots is too large, the MicroUSB mounting space is insufficient).

To meet the requirement of surface mounting the MicroUSB interface to the first square flat plate tensile body, the width FK1 of the first square flat plate tensile body of the square rigid FR-4 substrate satisfies: UA+2 mm≤FK1≤UA+5 mm, wherein UA is the width of the MicroUSB interface, in mm. The width FK2 of the second square flat plate tensile body satisfies: FK1<FK2 and $2\times\sqrt{YB^2-RA^2}-2$ mm≤FK2≤$2\times\sqrt{YB^2-RA^2}$, wherein YB is the radius of the circular rigid FR-4 substrate, RA is the closest distance from the circle center of the circular rigid FR-4 substrate to the square flat plate tensile body notch of the circular rigid FR-4 substrate, and FK1 is the width of the first square flat plate tensile body, in mm. The setting of the width FK2 of the second square flat plate tensile body can fully satisfy that after the circular rigid FR-4 substrate and the square rigid FR-4 substrate are assembled, it also needs soldering to achieve circuit connections between the pads J4 and J5, and between the pads J6 and J7, which requires a certain soldering operation space, so the lower limit of FK2 is set to $2\times\sqrt{YB^2-RA^2}-2$ mm≤FK2, which is very beneficial for a soldering operation; and FK2≤$2\times\sqrt{YB^2-RA^2}$ is set to ensure after the assembly of the circular rigid FR-4 substrate and the square rigid FR-4 substrate, the square rigid FR-4 substrate does not exceed the edges of the circular rigid FR-4 substrate, thereby achieving assembly of the square rigid FR-4 substrate, the circular rigid FR-4 substrate, and the plastic structural part without interference.

The microUSB interface is soldered to the side A of the square rigid FR-4 substrate, with the opening portion of the MicroUSB interface being on the side of the first square flat plate tensile body of the square rigid FR-4 substrate, and the distance UD from the plane at the outermost end of the opening portion of the MicroUSB interface to the plane at the nearest edge of the first square flat plate tensile body of the square rigid FR-4 substrate satisfies: SJ1−0.1 mm≤UD≤SJ1, wherein SJ1 is the height of the first tensile body of the plastic structural part, in mm. The setting of UD can achieve that the open end of the MicroUSB interface projects into the corresponding hollowed MicroUSB opening portion of the first tensile body of the plastic structural part, and does not exceed the outermost plane of the first tensile body of the plastic structural part, thus achieving good assembly and positioning of MicroUSB interface and plastic structural part.

The height FH1 of the first square flat plate tensile body and the height FH2 of the second square flat plate tensile body of the square rigid FR-4 substrate satisfy the following relationship: SJ1≤FH1 and UH−UD−FCG≤FH1+FH2<UH−UD−FCG+1 mm and YPmax≤FH2, wherein UH is the length of the MicroUSB interface, UD is the distance from the plane at the outermost end of the opening portion of the MicroUSB interface the plane at the nearest edge of the first square flat plate tensile body of the square rigid FR-4 substrate, FCG is the height of the square slots of the square rigid FR-4 substrate, and YPmax is the height of the highest component on the side B of the circular rigid FR-4 substrate, in mm. UH−UD−FCG≤FH1+FH2 specifies the minimum value of the total height of the square rigid FR-4 substrate (i.e. FH1+FH2+FCG), which satisfies that the MicroUSB is welded in a surface-mounted manner and is mounted to the MicroUSB opening portion of the plastic structural part; and FH1+FH2<UH−UD−FCG+1 mm specifies the maximum value of the total height of the square rigid FR-4 substrate, in full consideration of saving the space required for parts that do not contribute to the capacity, and minimizing the height space of the battery occupied by the square rigid FR-4 substrate, thereby leaving the saved height space to the cell, which is conducive to a high energy density of the battery.

The overall contour of the circular rigid FR-4 substrate is a circular tensile body (with a radius of YB) and it is provided with a square plat plate tensile body notch and a center hole having a diameter d1 (M3≤d1≤M3+0.3 mm, wherein M3 is the diameter of the third cylindrical body of the metal cap). To meet the requirement in the assembly of the circular rigid FR-4 substrate, the plastic structural part and the steel shell, the diameter 2×YB of the circular rigid FR-4 substrate must be smaller than the outer diameter SD2 of the second tensile body of the plastic structural part; that is; 2×YB<SD2; otherwise the installation is difficult or interference occurs; the diameter of the circular rigid FR-4 substrate must be smaller than the outer diameter of the second tensile body of the plastic structural part, and larger than the inner diameter of the second tensile body of the plastic structural part; that is, SD2−SDB×2<2×YB<SD2; otherwise the installation is difficult or interference occurs or the circular rigid FR-4 substrate projects into the inner space of the second tensile body of the plastic structural part during assembly such that the metal cap can move in the height direction.

The width YQK of the square flat plate tensile body notch of the circular rigid FR-4 substrate satisfies: FK1−2×FCKD≤YQK≤FK1−1.0 mm, wherein FK1 is the width of the first square flat plate tensile body of the square rigid FR-4 substrate, and FCKD is the width of the square slots of the square rigid FR-4 substrate, in mm. The dimensional setting can well achieve that the square rigid FR-4 is mounted and fitted to the square flat plate tensile body notch of the circular rigid FR-4 substrate through its square slots, and also achieves that the square rigid FR-4 substrate is clamped on the circular rigid FR-4 substrate; that is, if the FK1<YQK, that is, if the width YQK of the square flat plate tensile body notch of the circular rigid FR-4 substrate is too large, then the width of the first square flat plate tensile body of the square rigid FR-4 substrate is smaller than the width of the square flat plate tensile body notch of the circular rigid FR-4 substrate, and the square rigid FR-4 substrate will fall off and cannot be clamped on the circular rigid FR-4 substrate; and if YQK<FK1−2×FCKD, that is, if the width YQK of the square flat plate tensile body notch of the circular rigid FR-4 substrate is too small, then the square rigid FR-4 substrate cannot be fitted to the square flat plate tensile body notch of the circular rigid FR-4 substrate through its square slots due to interference.

The width YQK of the square flat plate tensile body notch of the circular rigid FR-4 substrate satisfies:

$$\left(\frac{SD2}{2} - SDB\right) - \sqrt{\left(\frac{SD2}{2} - SDB\right)^2 - \left(\frac{UA}{2}\right)^2} + UF - FHD \le$$
$$YQS \le YB - M1/2 + FHD - 0.2 \text{ mm, and } YQS = YB - RA,$$

wherein UF is the thickness of the MicroUSB interface, SD2 is the outer diameter of the second tensile body of the plastic structural part, SDB is the wall thickness of the second tensile body of the plastic structural part, UA is the width of the MicroUSB interface, YB is the radius of the circular rigid FR-4 substrate, RA is the closest distance from the circle center of the circular rigid FR-4 substrate to the square flat plate tensile body notch of the circular rigid FR-4 substrate, FHD is the thickness of the square rigid FR-4 substrate, and M1 is the diameter of the first cylindrical body of the metal cap. The setting of the lower limit of the depth YQS of the square flat plate tensile body notch of the circular rigid FR-4 substrate, that is, $$\left(\frac{SD2}{2} - SDB\right) - \sqrt{\left(\frac{SD2}{2} - SDB\right)^2 - \left(\frac{UA}{2}\right)^2} + UF - FHD \le YQS,$$

can achieve that the square PCB with the MicroUSB component being surface mounted thereon can be assembled with the plastic structural part without interference, and the MicroUSB can enter the internal cavity of the second tensile body of the plastic structural part; and the setting of the upper limit of the depth YQS of the square flat plate tensile body notch of the circular rigid FR-4 substrate, that is, YQS≤YB−M1/2+FHD−0.2 mm, can achieve that after the square PCB with the MicroUSB component being surface mounted thereon is assembled with the plastic structural part, the MicroUSB interface will not interfere with the metal cap, otherwise a charging cable may not be connected.

The circular rigid FR-4 substrate is a double-sided board, wherein totally nine components are soldered on the side A, that is, the side directly facing the first cylindrical body of the metal cap, including an integrated IC (integrating a charge function, a charge protection function and a constant voltage output function), a first resistor, a second resistor, a third resistor, a fourth resistor, an inductor, a first LED lamp, a second LED lamp, and a fourth capacitor; and totally five components are soldered on the side B, including a protection IC (including charge overvoltage protection, charge overcurrent protection, discharge undervoltage protection, discharge overcurrent protection, charge or discharge overtemperature protection, and short circuit protection), a fifth resistor, a first capacitor, a second capacitor, and a third capacitor, and the side B is also provided with a first pad and a second pad, a third pad, a fourth pad and a seventh pad. The circular rigid FR-4 substrate with the components welded thereon is hereinafter referred to as a circular PCB.

The square rigid FR-4 substrate is a double-sided board, wherein the MicroUSB interface is soldered on the side A (the side opposed to a central axis of the metal cap), and a fifth pad and a sixth pad are provided on the side B. The square rigid FR-4 substrate with the components welded thereon is hereinafter referred to as a square PCB.

The maximum height DXGmax of the lithium-ion cell satisfies: DXGmax≤H−H1−SJ1−SJ2−YH−FH2−GKDH, wherein H is the total height of the secondary lithium-ion battery, H1 is the height of the first cylindrical body of the metal cap, SJ1 is the height of the first tensile body of the plastic structural part, SJ2 is the height of the second tensile body of the plastic structural part, YH is the thickness of the circular rigid FR-4 substrate, FH2 is the height of the second square flat plate tensile body of the square rigid FR-4 substrate, and GKDH is the thickness of the bottom of the steel shell including the convex plate at the bottom, all in mm.

The high-energy-density secondary lithium ion battery is implemented as follows: firstly, a metal cap is mounted into a plastic structural part, with a first cylindrical body of the metal cap being clamped on an end face of a first tensile body of the plastic structural part, and second and third cylindrical bodies of the metal cap being inserted into a center hole of the plastic structural part and projecting into an internal cavity of a second tensile body of the plastic structural part; secondly, with a side A of a circular PCB facing upward, and a side A of the square PCB facing outward, a side B of the square PCB is perpendicularly assembled with the circular PCB, an opening of a MicroUSB interface being oriented the same as the side A of the circular PCB, and their assembly being performed in a clamped manner through a notch of a square flat plate tensile body of the circular PCB and square slots of the square PCB, to form a PCB assembly; thirdly, the PCB assembly is assembled with the plastic structural part installed with the metal cap, such that the MicroUSB interface is clamped into a hollowed MicroUSB opening portion of the plastic structural part along an opening direction, and the third cylindrical body of the metal cap is inserted into a center hole of the circular PCB; fourthly, soldered connection and fixation is carried out between a side B of the circular PCB and the side B of the square PCB, and between the side B of the circular PCB and the metal cap, that is, a fourth pad of the side B of the circular PCB is soldered to a fifth pad of the side B of the square PCB, a seventh pad of the side B of the circular PCB is soldered to a sixth pad of the side B of the square PCB, and a third pad of the side B of the circular PCB is soldered to the third cylindrical tensile body of the metal cap; fifthly, a positive electrode lead wire (which may be a nickel strip, a nickel-plated steel strip, or a conducting wire) is welded at a positive terminal of a lithium-ion cell, and a negative electrode lead wire (which may be a nickel strip or a nickel-plated steel strip) is welded at a negative terminal of the lithium-ion cell, and then the lithium-ion cell is placed into a steel shell, and the negative electrode lead wire of the lithium-ion cell is electrically connected to the steel shell (by soldering, press-fitting, electric resistance welding, laser welding, or the like); sixthly, the positive electrode lead wire of the lithium-ion cell is connected to a first pad of the side B of the circular PCB (if the positive electrode lead wire of the lithium-ion cell is a conducting wire or a nickel strip or a nickel-plated steel strip, soldering connection can be adopted; and if the positive electrode lead wire of the lithium-ion cell is a nickel strip or a nickel-plated steel strip, it's possible that the nickel sheet or the nickel-plated steel sheet is surface mounted to the first pad on the side B of the circular PCB, and then, the positive electrode lead wire of the lithium-ion cell is connected to the first pad of the side B of the circular PCB by resistance welding or laser welding); and the negative electrode lead wire of the lithium-ion cell is connected to a second pad on the side B of the circular PCB, in which soldering connection can be adopted, and it's also possible that a nickel sheet or a nickel-plated steel sheet is surface mounted to the second pad on the side B of the circular PCB, and then, the negative electrode lead wire of the lithium-ion cell is connected to the second pad of the side B of the circular PCB by resistance welding or laser welding; and seventhly, the second tensile body of the plastic structural part is inserted into the steel shell, and then a joint part of the second tensile body of the plastic structural part and the steel shell is punched by a steel pin, and the steel shell is deformed under force and embedded into the second tensile body of the plastic structural part, thus achieving fixation of the plastic structural part and the steel shell.

Compared with the prior art, the high-energy-density secondary lithium-ion battery of the present invention has the following advantages:

(1) The space occupied by accessory parts of the battery can be saved and a large capacity of the battery can be achieved. The plastic structural part integrates multiple functions of fixation of the metal cap, insulation and protection, and serving as a MicroUSB positioning and output interface part, etc.; the cylindrical bodies with different diameters at three ends of the metal cap not only function as output terminals of the battery to contact an external load, but also have the function of connecting and fixing the circular rigid FR-4 substrate, while taking into account reasonable distribution and balance among the current path, structural strength and the space occupation; and the arrangement and connection structure of the square rigid FR-4 substrate and the circular rigid FR-4 substrate achieves that the MicroUSB interface and other circuit components (the protection IC, the integrated IC, the resistors, the capacitors, and the inductor) are in non-interference arrangement in a three-dimensional space, thus further saving the valuable space. The minimization of the space occupied by accessory parts of the battery has the direct effect that a cell with a larger size and a larger capacity can be adopted, which is advantageous for achieving a high energy density of the battery.

(2) Multi-functional integration can be achieved. The secondary lithium-ion battery integrates three functions of a constant voltage output, charge management and protection, and overcharge, overdischarge and overcurrent protection, and structurally integrates the MicroUSB interface, so an ordinary 5V mobile phone charger and a matched charge cable can be used conveniently for charging, and a dedicated battery charger is not needed.

(3) The secondary lithium-ion battery can meet the requirements of the international standard structural dimensions and mechanical reliability. In the case of the high-energy-density secondary lithium-ion battery of the present invention, a creative structural layout and spatial planning is carried out on components or parts such as the rechargeable cell, the steel shell, the protection IC, the integrated IC (integrating a charging function and a constant voltage output function), the resistors, the capacitors, the inductor, the MicroUSB interface, the plastic structural part, the square rigid FR-4 substrate, the circular rigid FR-4 substrate, and the metal cap, etc., in full consideration of the reliability of the connections among the various parts, and further taking into account the achievability and convenience of assembling, welding or other operations. In this way, the integrated secondary lithium-ion battery can save the space occupied by accessory parts of the battery and achieves a large capacity of the battery, and the secondary lithium-ion battery can also meet the requirements of international standard structural dimensions and mechanical reliability (such as mechanical vibration, fall, etc.).

The high-energy-density secondary lithium-ion battery of the present invention is novel in structure and simple in fabrication. The high-energy-density secondary lithium-ion battery of the present invention meets the requirements of multi-functional integration, structural reliability, and process operability, and the secondary lithium-ion battery of the present invention can achieve an energy density increase of about ⅓ as compared with the prior art.

DETAILED DESCRIPTION OF THE EMBODIMENTS

The present invention is further described in detail below in conjunction with the accompanying drawings and embodiments.

Embodiment 1

Using an example of manufacturing a cylindrical high-energy-density secondary lithium-ion battery with a constant voltage output, implementations of the structure and function of the cylindrical high-energy-density secondary lithium-ion battery are further set forth, and a method for implementing the high energy density of the secondary lithium-ion battery is described.

Figure 1:
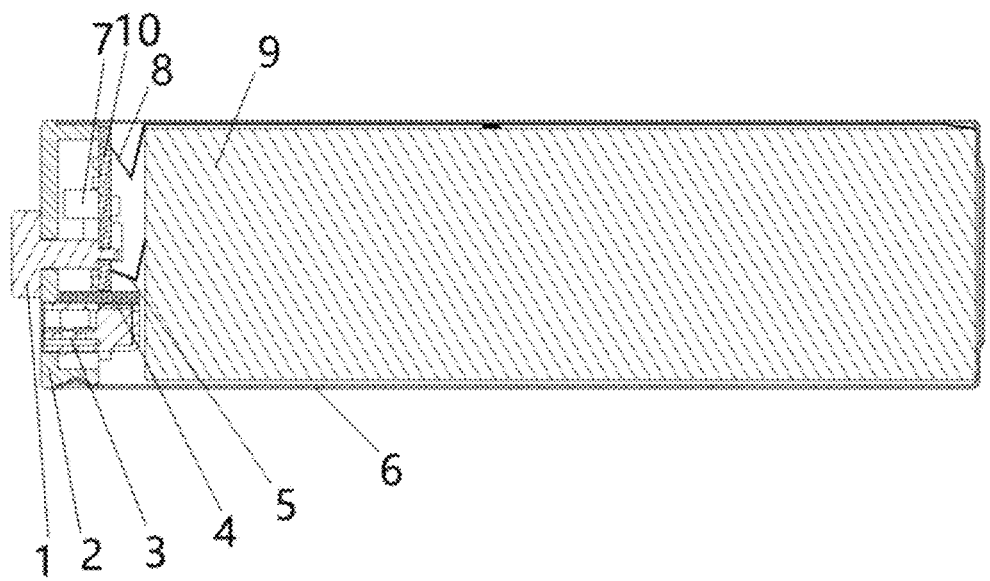
FIG. 1 is an overall sectional diagram of a secondary lithium-ion battery in embodiment 1.
Figure 2:
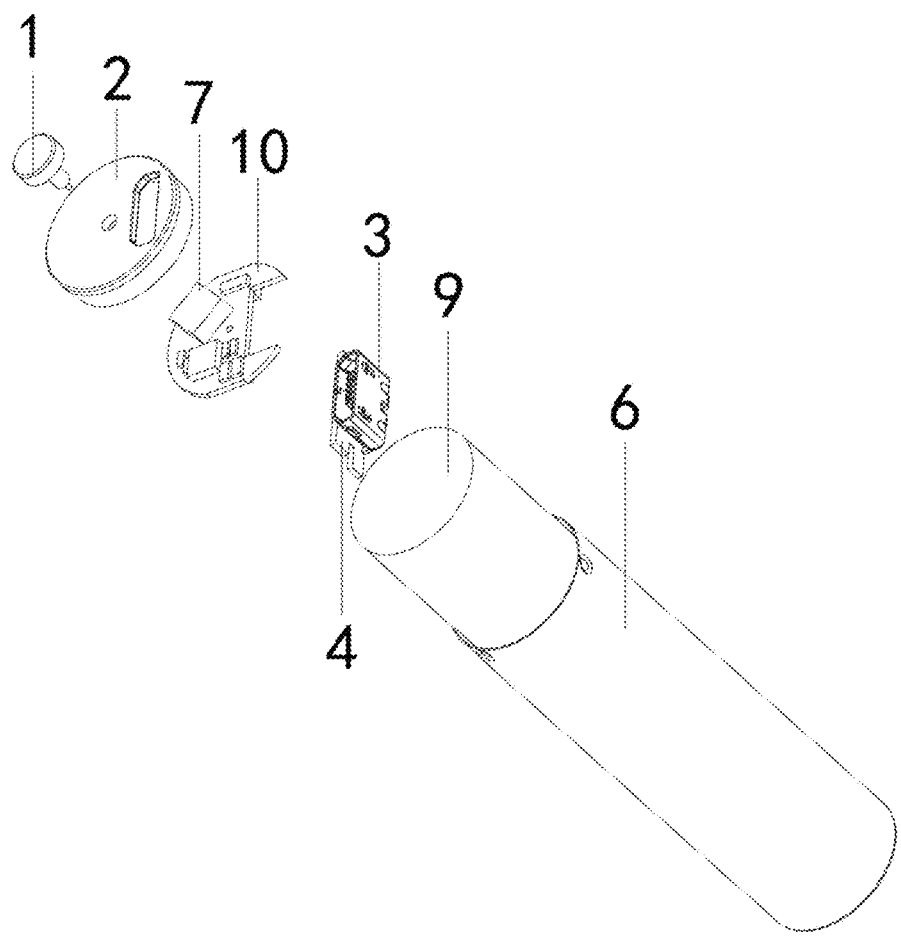
FIG. 2 is an exploded structure diagram of the secondary lithium-ion battery in embodiment 1.

A high-energy-density secondary lithium-ion battery is cylindrical (its overall outer dimensions need to meet the requirements of dimension specifications of the model R6S required by the standard in IEC60086-2:2011, MOD), and as required, the battery has a diameter smaller than or equal to 14.5 mm, and a height H smaller than or equal to 50.5 mm; the battery has a MicroUSB interface charging function, a charge management function; and charge protection and discharge protection functions; and the battery has a constant voltage of 1.55V±0.10V, and a persistent 1.0 A current output function. As shown in FIGS. 1 and 2, the high-energy-density secondary lithium-ion battery includes a metal cap 1, a plastic structural part 2, a MicroUSB interface 3, a square rigid FR-4 substrate 4, a positive electrode lead wire 5, a steel shell 6, components 7 (including resistors, capacitors, an inductor, etc.), a negative electrode lead wire 8, a lithium-ion cell 9, and a circular rigid FR-4 substrate 10, wherein the lithium-ion cell 9 of the embodiment is a polymer lithium-ion unit cell of model No. 13430 (with a diameter of 13.00±0.20 mm, and a height of $43.00^{+0}_{-1.0}$ mm), with a nominal voltage of 3.7V, and a capacity of 760 mAh; the steel shell 6 serves as a battery case, with an outer diameter GW=13.90±0.05 mm, an inner diameter GN=13.50±0.05 mm, a height of 48.00±0.05 mm, and a bottom thickness GKDH of 0.5 mm (including the height of a convex plate at the bottom); the lithium-ion cell 9 is placed inside the steel shell 6, and a second tensile body 202 of plastic structural part 2 is inserted into an open end of the steel shell 6 and cooperates therewith; the steel shell 6 is punched with a recess for embedded fixation to the plastic structural part 2; and the metal cap 1 is clamped into the plastic structural part 2 and partially exposed from an end face of a first tensile body 201 of the plastic structural part 2; the square rigid FR-4 substrate 4 soldered with the MicroUSB interface 3 in a surface-mounted manner and the circular rigid FR-4 substrate 10 soldered with the components 7 in a surface-mounted manner, assembled together, are clamped on the plastic structural part 2 in a mating manner with an opening of the MicroUSB interface 3 facing upward; and the positive electrode lead wire 5 of a positive terminal and the negative electrode lead wire 8 of a negative terminal of the lithium-ion cell 9 are correspondingly connected to a first pad and a second pad of a side B of the circular rigid FR-4 substrate 10 respectively.

Figure 3A:
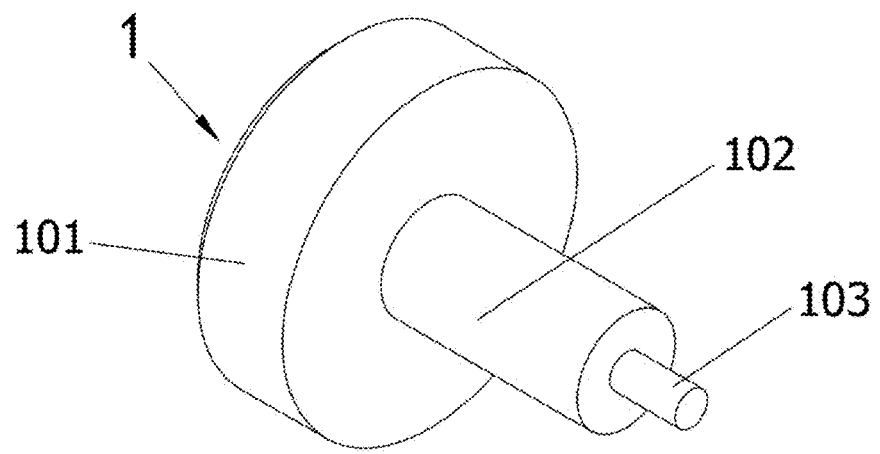
FIG. 3A is a 3D structure diagram of a metal cap in embodiment 1.
Figure 3B:
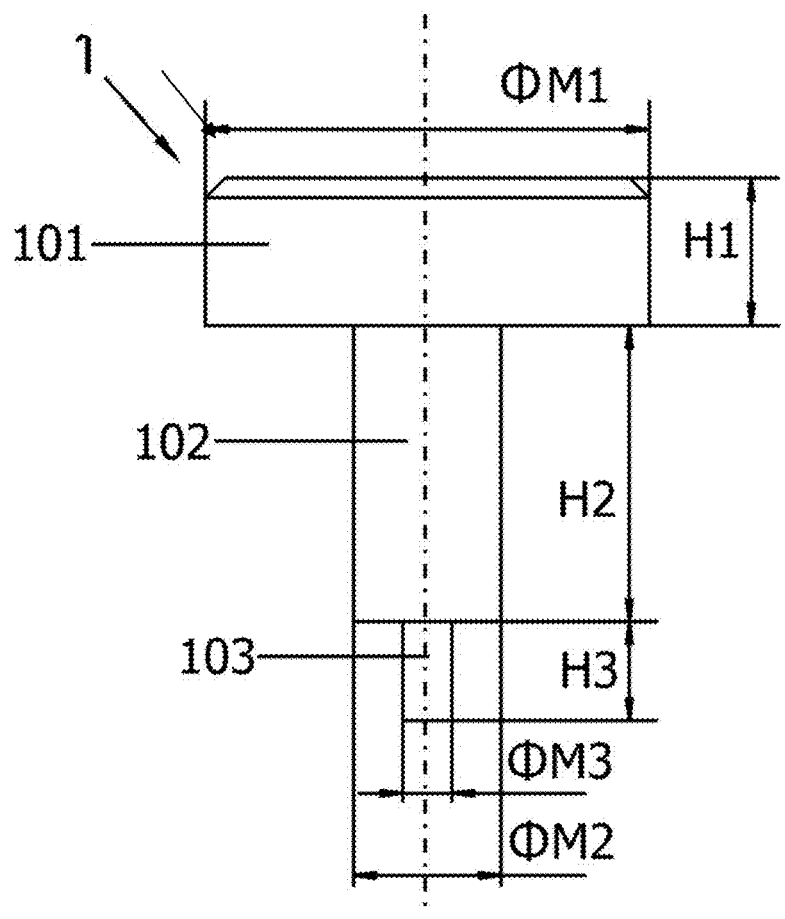
FIG. 3B is a schematic diagram of key feature dimensions of the metal cap in embodiment 1.

As shown in FIG. 3, the metal cap 1 includes a first cylindrical body 101, a second cylindrical body 102 and a third cylindrical body 103, an upper end face of the first cylindrical body 101 being chamfered, the first cylindrical body 101 being a structural part for the secondary lithium-ion battery to contact an external load or charging power source, the third cylindrical body 103, the second cylindrical body 102 and the first cylindrical body 101 being coaxial, a top surface of the second cylindrical body 102 being coplanar with a bottom surface of the first cylindrical body 101, and a top surface of the third cylindrical body 103 being coplanar with a bottom surface of the second cylindrical body 102. FIG. 3B shows key feature dimensions of the metal cap 1, wherein the diameter and height of the first cylindrical body 101 are M1 and H1, respectively, and the diameter and height of the second cylindrical body 102 are M2 and H2, respectively, and the diameter and height of the third cylindrical body 103 are M3 and H3, respectively. In embodiment 1, the aforementioned key feature dimensions of the metal cap 1 are set as follows: M1=4.50±0.05 mm, H1=1.50±0.05 mm, M2=1.50±0.05 mm, H2=2.80±0.05 mm, M3=0.50±0.05 mm, and H3=1.40±0.05 mm.

Figure 4A:
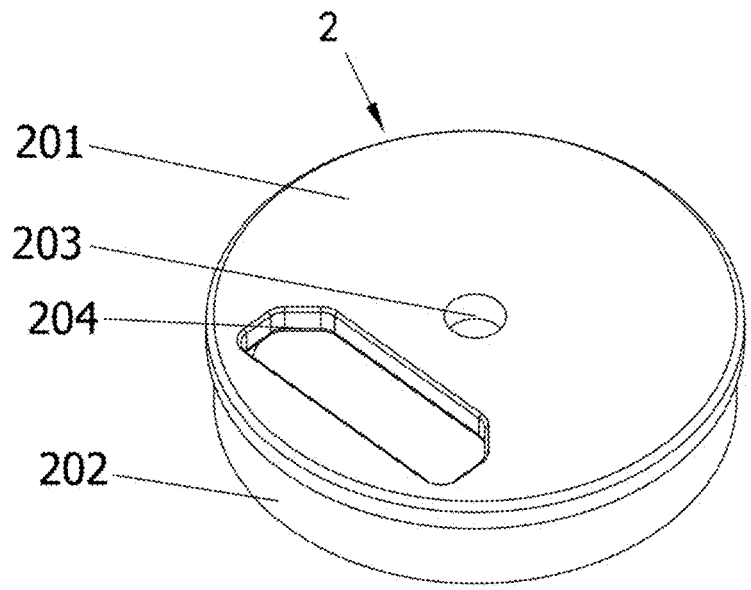
FIG. 4A is a 3D structure diagram I of a plastic structural part in embodiment 1.
Figure 4B:
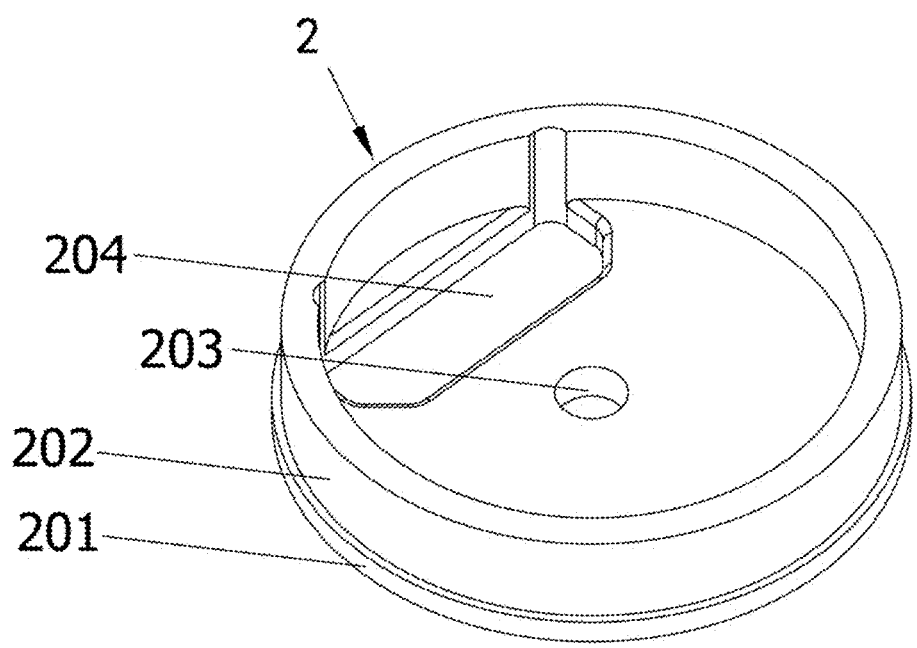
FIG. 4B is a 3D structure diagram II of the plastic structural part in embodiment 1.
Figure 4C:
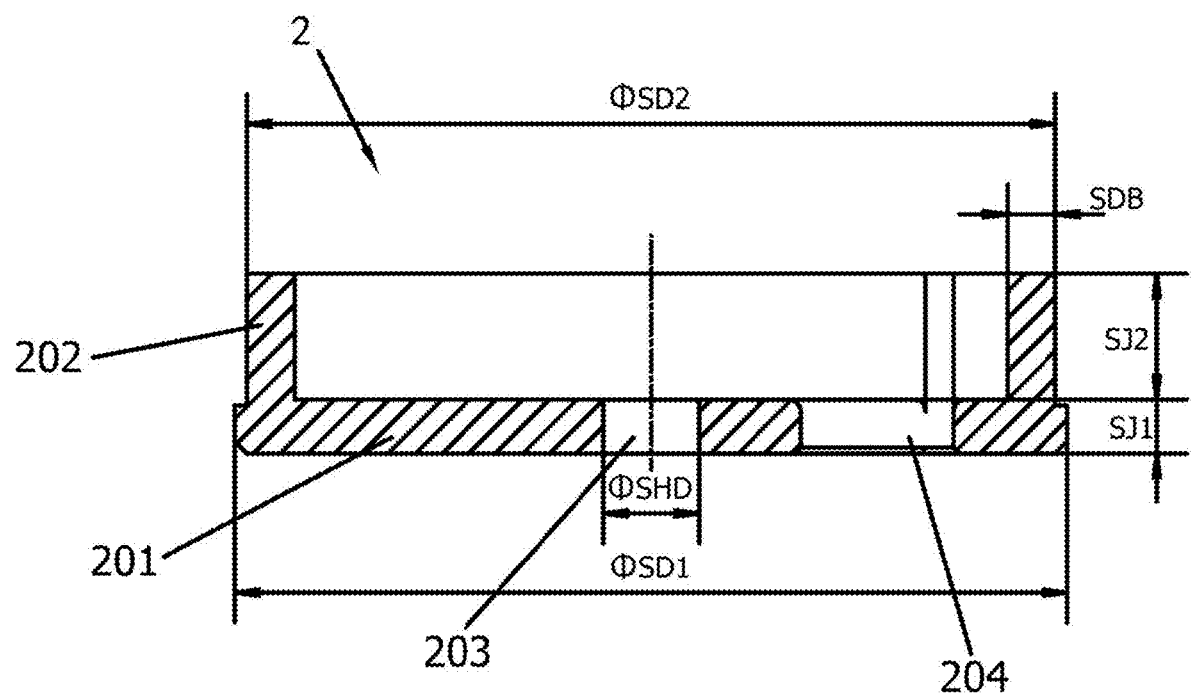
FIG. 4C is a schematic diagram of key feature dimensions of the plastic structural part in embodiment 1.

As shown in FIGS. 4A and 4B, the plastic structural part 2 includes the first tensile body 201 and the second tensile body 202, the first tensile body 201 being a cylindrical structure, the first tensile body 201 being provided with a center hole 203 and a MicroUSB opening portion 204, the second tensile body 202 being a cylindrical structure, one end of the second tensile body 202 being perpendicularly fixed to the bottom of the first tensile body 201, and the second tensile body 202 being coaxial with the first tensile body 201. FIG. 4C shows structural key dimensions of the plastic structural part 2, wherein the diameter and height of the first tensile body 201 are SD1 and SJ1, respectively, the outer diameter, height and wall thickness of the second tensile body 202 are SD2, SJ2 and SDB, respectively, and the diameter of the center hole 203 is SHD. In embodiment 1, the aforementioned key feature dimensions of the plastic structural part 2 are set as follows: $SD1=13.9^{+0}_{-0.1}$ mm, SJ1=0.80±0.05 mm, $SD2=13.5^{+0}_{-0.1}$ mm, SJ2=2.20±0.05 mm, SDB=0.80±0.05 mm, and SHD=1.60±0.05 mm.

Figure 5:
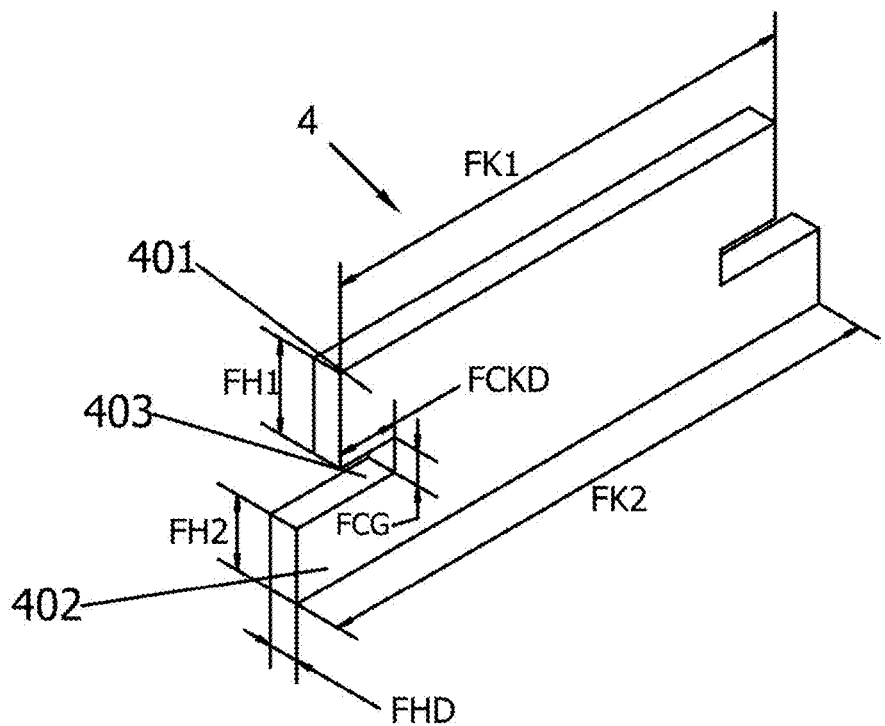
FIG. 5 is a schematic diagram of key feature dimensions of a square rigid FR-4 substrate in embodiment 1.

As shown in FIG. 5, the square rigid FR-4 substrate 4 includes a first square flat plate tensile body 401 and a second square flat plate tensile body 402, the first square flat plate tensile body 401 being combined with the second square flat plate tensile body 402 into a whole, and two hollowed square slots 403 symmetrical about a central axis being formed at a joint part of the first square flat plate tensile body 401 and the second square flat plate tensile body 402. Structural key dimensions of the square rigid FR-4 substrate 4 are as follows: the width and height of the first square flat plate tensile body 401 are FK1 and FH1, respectively, the width and height of the second square flat plate tensile body 402 are FK2 and FH2, respectively, the width and height of the square slots 403 are FCKD and FCG, respectively, and the thickness of the square rigid FR-4 substrate 4 is FHD. In embodiment 1, the aforementioned key feature dimensions of the square rigid FR-4 substrate 4 are set as follows: FK1=10.00 mm±0.05, FH1=1.90±0.05 mm, FK2=12.00±0.05 mm, FH2=1.50±0.05 mm, FCKD=1.25±0.05 mm, FCG=0.70±0.05 mm, and FHD=0.60±0.05 mm.

Figure 6:
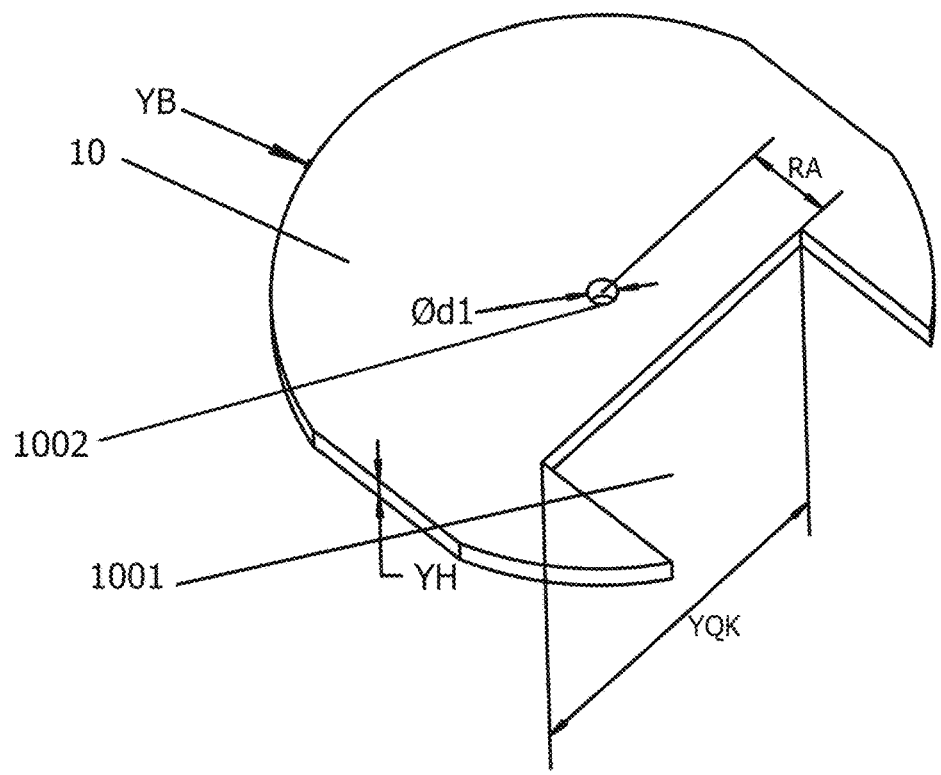
FIG. 6 is a schematic diagram of key feature dimensions of a circular rigid FR-4 substrate in embodiment 1.

As shown in FIG. 6, the overall contour of the circular rigid FR-4 substrate 10 is a circular tensile body, and the circular rigid FR-4 substrate is provided with a square flat plate tensile body notch 1001 and a center hole 1002. Structural key dimensions of the circular rigid FR-4 substrate 10 are as follows: the radius and thickness of the circular rigid FR-4 substrate 10 are YB and YH, respectively, the width and depth of the square flat plate tensile body notch 1001 are YQK, and YQS=YB–RA, respectively, and the diameter of the center hole 1002 is d1. In embodiment 1, the aforementioned key feature dimensions of the circular rigid FR-4 substrate 10 are set as follows: YB=6.65 mm±0.05, YH=0.60±0.05 mm, YQK=7.60 mm, YQS=YB–RA=6.65–1.90=4.75±0.05 mm, and d1=0.60±0.05 mm.

Figure 7:
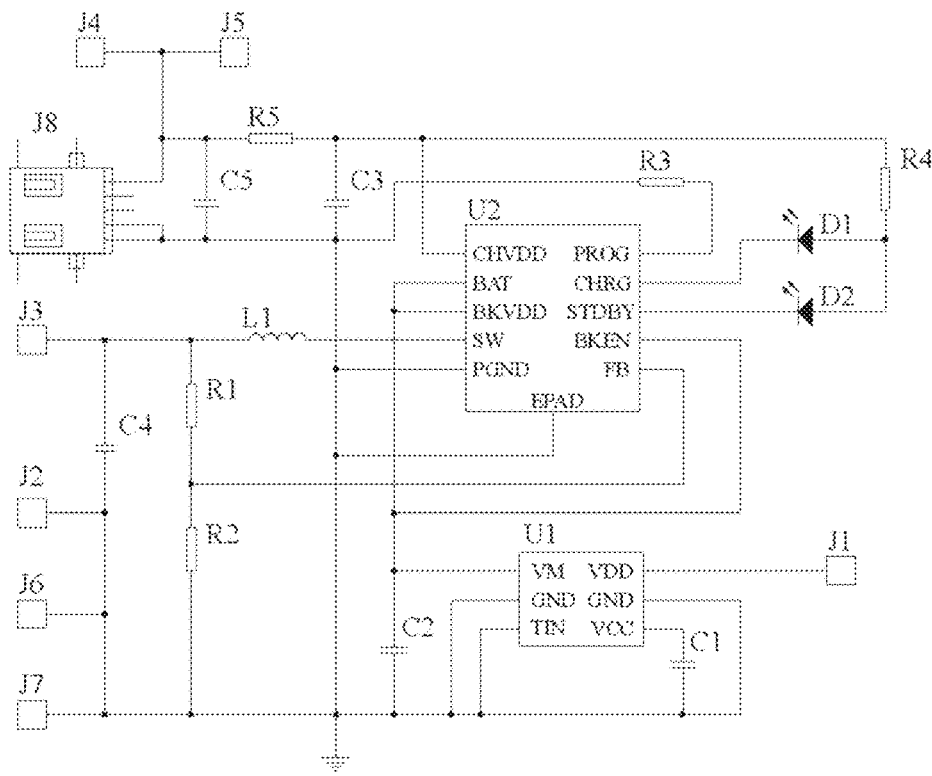
FIG. 7 is a circuit diagram of embodiment 1.

As shown in FIG. 7, it can be seen from the schematic diagram of the embodiment that the embodiment includes the following circuit components: an integrated IC, that is, U2 (model XS5302), a first resistor R1 (specification: 158K±1%), a second resistor R2 (specification: 100K±1%), a third resistor R3 (specification: 1.5K±1%), a fourth resistor R4 (specification: 1K±1%), a fifth resistor R5 (specification: 0.4 ohm 1%)), an inductor L1 (model 2.2 uH/3 A), a first LED lamp D1 (model HL0402USR), a second LED lamp D2 (model HL0402USG), a first capacitor C1 (specification:

0.1 uF, 10V), a second capacitor C2 (10 µF, 10V), a third capacitor C3 (10 µF, 10V), a fourth capacitor C4 (22 µF, 10V), and a protection IC, that is, U1 (model CT2105); and there are a first port J1, a second port J2, a third port J3, a fourth port J4, a fifth port J5, a sixth port J6, a seventh port J7, and an eighth port J8. The port J8 represents the MicroUSB interface (specification: a length UH=5±0.05 mm, a width UA=7.5±0.05 mm, and a thickness UF=2.45±0.05 mm), and the port J3 represents the metal cap.

In the embodiment, the protection IC, that is, U1 (model CT2105), has the function of battery charge and discharge process protection, mainly including: overcharge protection (the overcharge detection voltage is 4.275±0.050V, the overcharge release voltage is 4.075±0.025V, and the overcharge voltage detection delay time is 0.96-1.40 s), overdischarge protection (the overdischarge detection voltage is 2.500±0.050V, the overdischarge release voltage is 2.900±0.025V, and overdischarge voltage detection delay time is 115-173 mS), overcharge current protection (the overcharge current for detection is 2.1-3.9 A, the overcharge current detection delay time is 8.8-13.2 mS), overdischarge current protection (the overdischarge current for detection is 2.5-4.5 A, and the overdischarge current detection delay time is 8.8-13.2 mS), and short circuit protection (the load short circuit detection voltage is 1.20-1.30V, the load short circuit detection delay is 288-432 S).

In the embodiment, the integrated IC, that is, U2 (model XS5302), has the function of battery charge management, charge process protection, and constant voltage output, mainly including: charge management (the adapter voltage input is 4.5V-6.5V, the IC can provide a charge voltage of 4.2V±1% to charge the battery; the maximum charge current 1C can reach 700 mA; the magnitude of the charge current is set by the third resistor R3 in FIG. 7, and the maximum charge current in the embodiment corresponding to R3=1.5K is 666 mA; charging is cut off when the charge current is reduced to 0.1 C), charge protection (a trickle charge mode is adopted when the battery voltage is lower than 2.9V; overcurrent protection, short circuit protection, and temperature protection are provided during charging), a constant voltage output (an output operation is carried out at a constant frequency of 1.5 MHz, and can be performed at a maximum current of 2 A; the constant output voltage in the embodiment is 1.55V; overcurrent protection, short circuit protection, temperature protection, and low voltage lock protection are provided).

Figure 8A:
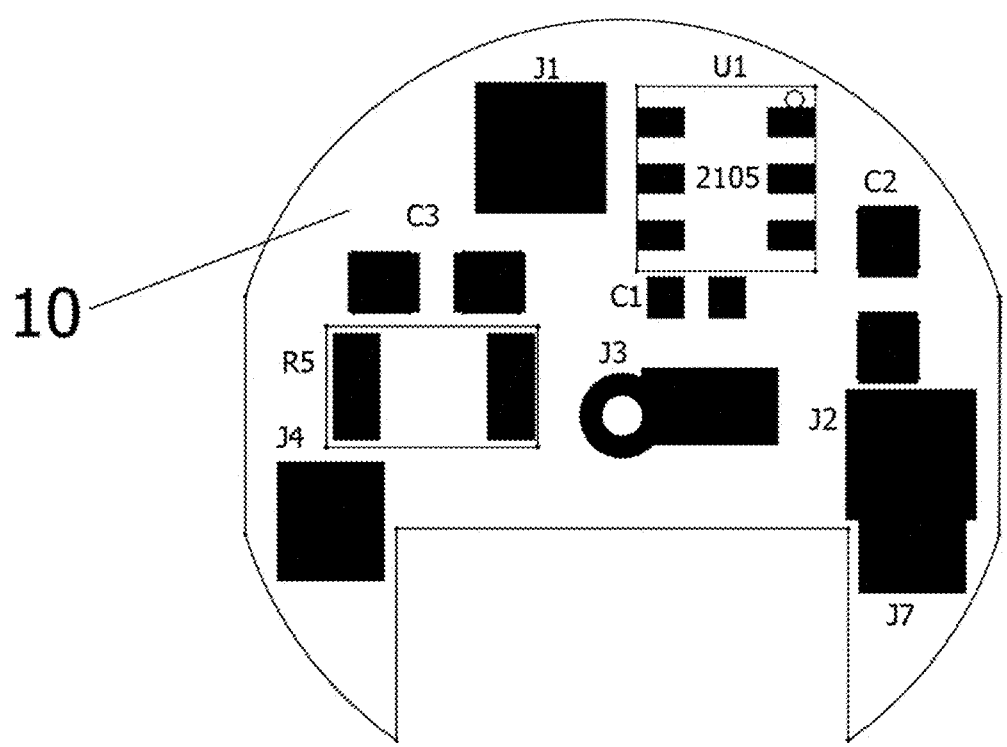
FIG. 8A is a schematic diagram of surface-mounted positions of components on a side B of the circular rigid FR-4 substrate in embodiment 1.

As shown in FIG. 8A, the following components are soldered to the side B of the circular rigid FR-4 substrate 10 in a surface-mounted manner: the fifth resistor R5, the first capacitor C1, the second capacitor C2, the third capacitor C3, and the protection IC, that is, U1; and there are the first port J1, the second port J2, the third port J3, the fourth port J4, and the seventh port J7, and the five ports are all provided with pads for a soldering operation, wherein the pad of the second port J2 is electrically connected with the pad of the seventh port J7. In the embodiment, the highest component on the side B of the circular rigid FR-4 substrate 10 is the protection IC, that is, U1, which has a height YPmax of 1.35 mm.

Figure 8B:
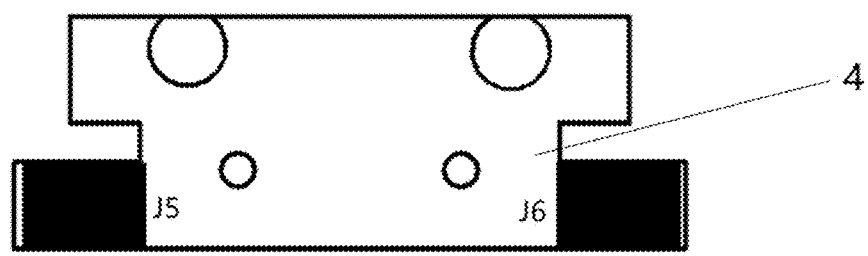
FIG. 8B is a schematic diagram of surface-mounted positions of components on a side B of the square rigid FR-4 substrate in embodiment 1.

As shown in FIG. 8B, a side B of the square rigid FR-4 substrate 4 has the fifth port J5 and the sixth port J6, both of which are provided with pads for a soldering operation.

Figure 9A:
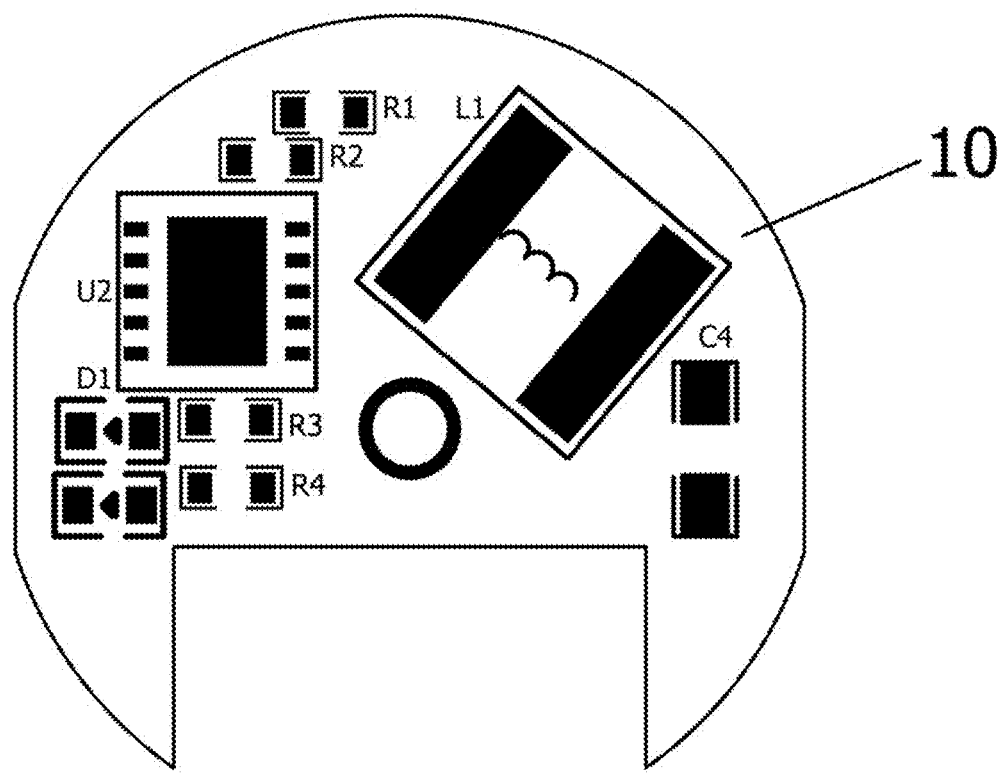
FIG. 9A is a schematic diagram of surface-mounted positions of components on a side A of the circular rigid FR-4 substrate in embodiment 1.

As shown in FIG. 9A, the following components are soldered to the side A of the circular rigid FR-4 substrate 10 in a surface-mounted manner: the integrated IC, that is, U2, the first resistor R1, the second resistor R2, the third resistor R3, the fourth resistor R4, the inductor L1, the first LED lamp D1, the second LED lamp D2, and the fourth capacitor C4. In the embodiment, the highest component on the side A of the circular rigid FR-4 substrate 10 is the inductor L1, which has a height YJmax of 1.80 mm. The circular rigid FR-4 substrate 10 with the components welded thereon is hereinafter referred to as a circular PCB.

Figure 9B:
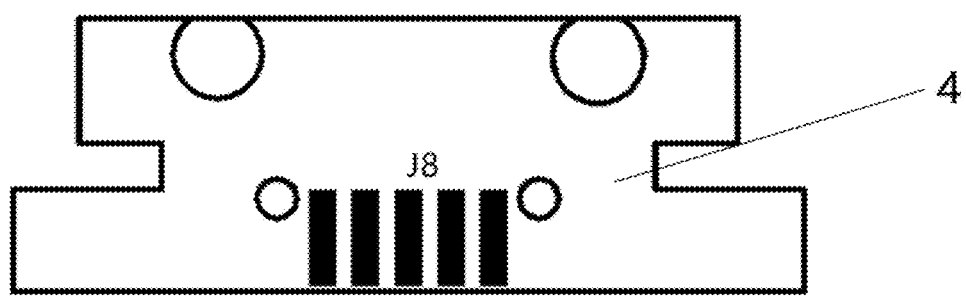
FIG. 9B is a schematic diagram of surface-mounted positions of components on a side A of the square rigid FR-4 substrate in embodiment 1.

As shown in FIG. 9B, the MicroUSB interface 3 is soldered to the side A of the square rigid FR-4 substrate 4 in a surface-mounted manner. The square rigid FR-4 substrate 4 with the components welded thereon is hereinafter referred to as a square PCB.

Structural feature dimensions of the metal cap 1 in the embodiment satisfy: M2 (=1.50 mm)<M1 (=4.50 mm) and 0.5 mm≤M2 (=1.50 mm)≤3 mm; SJ1+Yjmax (=0.80+1.80=2.60 mm)≤H2 (=2.80 mm) and SJ1+SJ2−0.8 (=0.80+2.20−0.8=2.20 mm)≤H2 (=2.80 mm)≤SJ1+SJ2−0.2 mm (=0.80+2.20−0.2=2.80 mm), wherein SJ1 is the height of the first tensile body of the plastic structural part, YJmax is the height of the highest component on the side A of the circular rigid FR-4 substrate, that is, the side directly facing the first cylindrical body of the metal cap, and SJ2 is the height of the second tensile body of the plastic structural part. The setting of lower limit of M2 can ensure the metal cap has certain strength and can well support a pressing contact force from the outside; and the setting of the upper limit of M2 can reduce an internal space of the battery occupied by the metal cap, thereby leaving more space for the side A of the circular rigid FR-4 substrate to arrange circuit components. The setting of the lower limit of the height H2 can fully meet the assembly requirement of the circular rigid FR-4 substrate after surface mounting and the metal cap and the plastic structural part, without interference; and the setting of the upper limit of the height H2 can reduce the battery space occupied by the metal cap, the plastic structural part and the circular rigid FR-4 substrate after assembly, thus leaving more space for the large-size high-capacity cell.

Structural feature dimensions of the metal cap 1 in the embodiment satisfy: M3 (=0.50 mm)<M2 (=1.50 mm) and 0.1 mm≤M3 (=0.50 mm)≤1 mm; YH+0.2 (=0.60+0.2=0.8 mm)≤H3 (=1.40 mm)≤YH+2 mm (=0.60+2=2.6 mm) and YH+SJ1+SJ2 (=0.60+0.80+2.20=3.60 mm)≤H3+H2 (=1.40+2.80=4.20 mm)≤YH+SJ1+SJ2+1.0 mm (=0.60+0.80+2.20+1.0=4.60 mm), wherein YH is the thickness of the circular rigid FR-4 substrate. The setting of lower limit of M3 can ensure the metal cap has certain strength after soldered connection with the circular rigid FR-4 substrate and can well support a pressing contact force from the outside; and the setting of the upper limit of M3 can reduce an internal space of the battery occupied by the metal cap, thereby leaving more space for the side B of the circular rigid FR-4 substrate to arrange circuit components. The setting of the lower limit of the height H3 can fully meet the assembly process requirements of soldering the metal cap to the side B of the circular rigid FR-4 substrate through the third cylindrical body; and the setting of the upper limit of the height H3 can reduce the battery space occupied in the height direction by the metal cap, the plastic structural part and the circular rigid FR-4 substrate after assembly, thus leaving more space for the large-size high-capacity cell.

The joint limitation of the height H2 and the height H3 of the metal cap can achieve that the first cylindrical body of the metal cap is tightly clamped at a top end of the first tensile body of the plastic structural part, and the circular rigid FR-4 substrate is tightly clamped at a bottom end of the second tensile body of the plastic structural part, and both the metal cap and the circular rigid FR-4 substrate can be stably fixed to meet the requirements of mechanical properties such as battery vibration and fall.

Key structural feature dimensions of the plastic structural part 2 in the embodiment of the present invention satisfy that: the diameter SD1 (=13.90 mm) of the first tensile body of the plastic structural part is equal to the outer diameter GW (=13.90 mm) of the steel shell, and the height of 0.8 mm of the first tensile body satisfies SJ1=0.5–1 mm (if the height SJ1 is too small, the strength is not enough, so SJ1 is larger than or equal to 0.5 mm; and if the height SJ1 is too large, the height space of the battery is occupied, so SJ1 is smaller than or equal to 1 mm); and the circular tensile body is provided with a center hole, the diameter SHD of which satisfies: M2 (=1.50 mm)<SHD (=1.60)<M1 (=4.50 mm) (the diameter of the hole is smaller than M1, so that the first cylindrical body of the metal cap is clamped above the center hole, and the pressing contact force from the outside of the battery is transmitted to the plastic structural part through the first cylindrical body of the metal cap, and the plastic structural part is supported on the steel shell, so the force externally applied to the metal cap is mostly borne by the steel shell of the battery, thus avoiding that the force is applied to the circular rigid FR-4 substrate and its circuits and circuit components, the cell, the square rigid FR-4 substrate and its circuits, inside the battery, which is beneficial to improving the overall reliability and safety of the battery.).

The outer diameter SD2 of the second tensile body of the plastic structural part 2 in the embodiment of the present invention satisfies: GN–0.5 mm (=13.50-0.5=13.0 mm)≤SD2 (=13.50 mm)≤GN (=13.50 mm), wherein GN is the inner diameter of the steel shell; and the wall thickness SDB=0.8 mm of the second tensile body satisfies SDB=0.5–1 mm (if the thickness SDB is too small, the strength is not enough, so SDB is larger than or equal to 0.5 mm; and if the thickness SDB is too large, the space in the diameter direction of the battery is occupied, so SDB is smaller than or equal to 1 mm). The dimensional setting of SD2 can fully meet the requirement that the plastic structural part projects into the steel shell of the battery through the second tensile body, and is clamped through the first tensile body of the plastic structural part, so there is SD2≤GN; moreover, to fully reserve the space to the circular rigid FR-4 substrate and the square rigid FR-4 substrate, there is GN–0.5 mm≤SD2.

The height SJ2 of the second tensile body of the plastic structural part 2 in the embodiment of the present invention satisfies: Yjmax (=1.80 mm)≤SJ2 (=2.20 mm)≤YJmax+1 (=1.80+1=2.80 mm) mm, wherein YJmax is the height of the highest component on the side A of the circular rigid FR-4 substrate, that is, the side directly facing the first cylindrical body of the metal cap. The dimensional setting of YJmax≤SJ2 can ensure the circular rigid FR-4 substrate after surface mounting can be well assembled with the plastic structural part without interference. SJ2≤YJmax+1 mm is set in full consideration of saving the space required for parts that do not contribute to the capacity, and minimizing the height space of the battery occupied by the plastic structural part, thereby leaving the saved height space to the cell, which is conducive to a high energy density of the battery.

Key structural feature dimensions of the square rigid FR-4 substrate 4 in the embodiment satisfy: YH(=0.60 mm)<FCG (=0.70 mm)≤YH+0.2 mm (=0.60+0.2=0.80 mm) (YH<FCG can fully meet the requirement of assembling the circular rigid FR-4 substrate and the square rigid FR-4 substrate through the hollowed square slots; FCG≤YH+0.2 mm can satisfy that after the circular rigid FR-4 substrate and the square rigid FR-4 substrate are assembled, it also needs soldering to achieve circuit connections between the pads J4 and J5, and between the pads J6 and J7, and if FCG is too large, the implementation of the soldering process is affected), wherein YH is the thickness of the circular rigid FR-4 substrate; in the embodiment, the width FCKD of the square slots is 1.25 mm, which satisfies FCKD=0.5-2 mm (the setting of the width FCKD of the square slots can meet the strength requirement of the clamped assembly of the circular rigid FR-4 substrate and the square rigid FR-4 substrate, and also can meet the requirement of surface mounting of the MicroUSB interface to the square rigid FR-4 substrate; if the width FCKD of the square slots is too small, the strength is insufficient; and if the width FCKD of the square slots is too large, the MicroUSB mounting space is insufficient).

To meet the requirement of surface mounting the MicroUSB interface to the first square flat plate tensile body of the square rigid FR-4 substrate, the width FK1 of the first square flat plate tensile body of the square rigid FR-4 substrate satisfies: UA+2 (=7.50+2=9.6 mm)≤FK1 (=10.00 mm)≤UA+5 mm (=7.50+5=12.5 mm), wherein UA is the width of the MicroUSB interface. The width FK2 of the second square flat plate tensile body satisfies: FK1 (=10.0 mm)<FK2 (=12.00 mm) and $2 \times \sqrt{YB^2 - RA^2} - 2$ mm (=2× $\sqrt{6.65^2 - 1.9^2} - 2 = 12.74 - 2 = 10.74$ mm)≤FK2 (=12.00 mm)≤$2 \times \sqrt{YB^2 - RA^2}$ (=2× $\sqrt{6.65^2 - 1.9^2} = 12.74$ mm), wherein YB is the radius of the circular rigid FR-4 substrate, RA is the closest distance from the circle center of the circular rigid FR-4 substrate to the square flat plate tensile body notch of the circular rigid FR-4 substrate, and FK1 is the width of the first square flat plate tensile body. The setting of the width FK2 of the second square flat plate tensile body can fully satisfy that after the circular rigid FR-4 substrate and the square rigid FR-4 substrate are assembled, it also needs soldering to achieve circuit connections between the pads J4 and J5, and between the pads J6 and J7, which requires a certain soldering operation space, so the lower limit of FK2 is set to $2 \times \sqrt{YB^2 - RA^2} - 2$ mm≤FK2, which is very beneficial for a soldering operation; and FK2≤$2 \times \sqrt{YB^2 - RA^2}$ is set to ensure after the assembly of the circular rigid FR-4 substrate and the square rigid FR-4 substrate, the square rigid FR-4 substrate does not exceed the edges of the circular rigid FR-4 substrate, thereby achieving assembly of the square rigid FR-4 substrate, the circular rigid FR-4 substrate, and the plastic structural part without interference.

Figure 10:
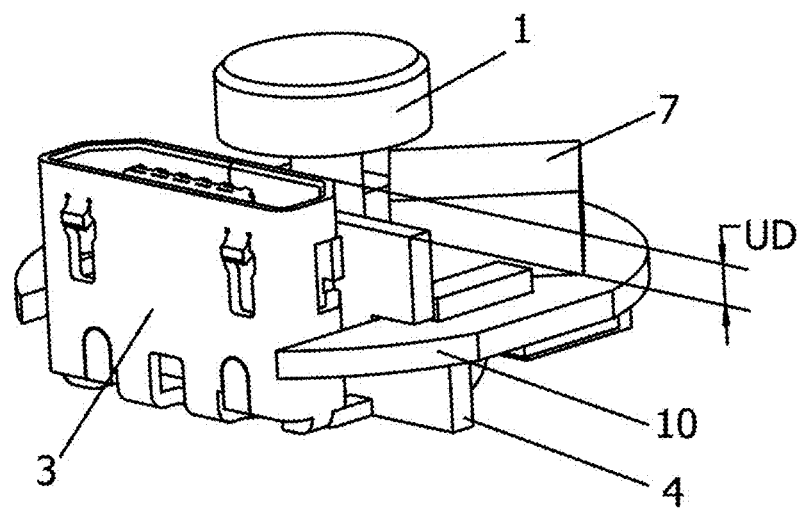
FIG. 10 is an assembly structure diagram of the metal cap, a circular PCB and a square PCB in embodiment 1.

The microUSB interface 3 is soldered to the side A of the square rigid FR-4 substrate 4, with the opening portion of the MicroUSB interface 3 being on the side of the first square flat plate tensile body 401 of the square rigid FR-4 substrate 4, and the distance UD from the plane at the outermost end of the opening portion of the MicroUSB interface 3 to the plane at the nearest edge of the first square flat plate tensile body of the square rigid FR-4 substrate (as shown in FIG. 10, UD=0.70±0.05 mm in the embodiment) satisfies: SJ1–0.1 mm (=0.80–0.1=0.7 mm)≤UD (=0.70 mm)≤SJ1 (=0.80 mm), wherein SJ1 is the height of the first tensile body of the plastic structural part. The setting of UD can achieve that the open end of the MicroUSB interface projects into the corresponding hollowed MicroUSB opening portion of the first tensile body of the plastic structural part, and does not exceed the outermost plane of the first tensile body of the plastic structural part, thus achieving good assembly and positioning of MicroUSB interface and plastic structural part.

In the embodiment, the height FH1 of the first square flat plate tensile body and the height FH2 of the second square flat plate tensile body of the square rigid FR-4 substrate 4 satisfy the following relationship: SJ1 (=0.80 mm)≤FH1 (=1.90 mm) and UH−UD−FCG (=5−0.70−0.7=3.4 mm)≤FH1+FH2 (=1.90+1.50=3.40 mm)≤UH−UD−FCG+1 mm (=5−0.70−0.7+1=4.4 mm) and YPmax (=1.35 mm)≤FH2 (=1.50 mm), wherein UH is the length dimension of the MicroUSB interface, UD is the distance from the plane at the outermost end of the opening portion of the MicroUSB interface to the plane at the nearest edge of the first square flat plate tensile body of the square rigid FR-4 substrate, FCG is the height of the square slots of the square rigid FR-4 substrate, and YPmax is the height of the highest component on the side B of the circular rigid FR-4 substrate. UH−UD−FCG≤FH1+FH2 specifies the minimum value of the total height of the square rigid FR-4 substrate (i.e. FH1+FH2+FCG), which satisfies that the MicroUSB is welded in a surface-mounted manner and is mounted to the MicroUSB opening portion of the plastic structural part; and FH1+FH2<UH−UD−FCG+1 mm specifies the maximum value of the total height of the square rigid FR-4 substrate, in full consideration of saving the space required for parts that do not contribute to the capacity, and minimizing the height space of the battery occupied by the square rigid FR-4 substrate, thereby leaving the saved height space to the cell, which is conducive to a high energy density of the battery.

Key structural feature dimensions of the circular rigid FR-4 substrate 10 in the embodiment satisfy the following design condition: the center hole with a diameter d1 of the circular rigid FR-4 substrate satisfies: M3 (=0.50 mm)≤d1 (=0.60) Mm)≤M3+0.3 mm (=0.5+0.3=0.8 mm), wherein M3 is the diameter of the third cylindrical body of the metal cap). To meet the requirement in the assembly of the circular rigid FR-4 substrate, the plastic structural part and the steel shell, the diameter of the circular rigid FR-4 substrate must be smaller than the outer diameter of the second tensile body of the plastic structural part, and larger than the inner diameter of the second tensile body of the plastic structural part; that is, SD2−SDB×2) (=13.5−0.8×=11.9 mm)≤2×YB (=2×6.65=13.30)<SD2 (=13.50 mm); otherwise the installation is difficult or interference occurs or the circular rigid FR-4 substrate projects into the inner space of the second tensile body of the plastic structural part during assembly such that the metal cap can move in the height direction.

The width YQK of the square flat plate tensile body notch of the circular rigid FR-4 substrate 10 in the embodiment satisfies: FK1−2×FCKD(=10−2×1.25=7.5 mm)≤YQK (=7.60 mm)≤FK1−1.0 mm (=10−1=9 mm), wherein FK1 is the width of the first square flat plate tensile body of the square rigid FR-4 substrate, and FCKD is the width of the square slots of the square rigid FR-4 substrate. The dimensional setting can well achieve that the square rigid FR-4 is mounted and fitted to the square flat plate tensile body notch of the circular rigid FR-4 substrate through its square slots, and also achieves that the square rigid FR-4 substrate is clamped on the circular rigid FR-4 substrate; that is, if FK1≤YQK, that is, if the width YQK of the square flat plate tensile body notch of the circular rigid FR-4 substrate is too large, then the width of the first square flat plate tensile body of the square rigid FR-4 substrate is smaller than the width of the square flat plate tensile body notch of the circular rigid FR-4 substrate, and the square rigid FR-4 substrate will fall off and cannot be clamped on the circular rigid FR-4 substrate; and if YQK<FK1−2*FCKD, that is, if the width YQK of the square flat plate tensile body notch of the circular rigid FR-4 substrate is too small, then the square rigid FR-4 substrate cannot be fitted to the square flat plate tensile body notch of the circular rigid FR-4 substrate through its square slots due to interference.

The depth YQS of the square flat plate tensile body notch of the circular rigid FR-4 substrate in the embodiment satisfies:

$$\left(\frac{SD2}{2}-SDB\right)-\sqrt{\left(\frac{SD2}{2}-SDB\right)^2-\left(\frac{UA}{2}\right)^2}+UF+$$
$$FHD\left(=\left(\frac{13.5}{2}-0.8\right)-\sqrt{\left(\frac{13.5}{2}-0.8\right)^2-\left(\frac{7.5}{2}\right)^2}+2.45+0.6=\right.$$
$$\left.5.95-4.62+2.45+0.6=4.38\text{ mm}\right)\leq$$
$$(YQS=YB-RA)(=6.65-1.9=4.75\text{ mm})\leq$$
$$YB-M1/2+FHD-0.2\text{ mm}(=6.65-4.5/2+0.6-0.2=4.80\text{ mm}),$$

wherein UF is the thickness of the MicroUSB interface, SD2 is the outer diameter of the second tensile body of the plastic structural part, SDB is the wall thickness of the second tensile body of the plastic structural part, UA is the width of the MicroUSB interface, YB is the radius of the circular rigid FR-4 substrate, RA is the closest distance from the circle center of the circular rigid FR-4 substrate to the square flat plate tensile body notch of the circular rigid FR-4 substrate, FHD is the thickness of the square rigid FR-4 substrate, and M1 is the diameter of the first cylindrical body of the metal cap. The setting of the lower limit of the depth YQS of the square flat plate tensile body notch of the circular rigid FR-4 substrate, that is, $$\left(\frac{SD2}{2}-SDB\right)-\sqrt{\left(\frac{SD2}{2}-SDB\right)^2-\left(\frac{UA}{2}\right)^2}UF-FHD\leq$$
$$(YQS=YB-RA),$$

can achieve that the square PCB with the MicroUSB component being surface mounted thereon can be assembled with the plastic structural part without interference, and the MicroUSB can enter the internal cavity of the second tensile body of the plastic structural part; and the setting of the upper limit of the depth YQS of the square flat plate tensile body notch of the circular rigid FR-4 substrate, that is, (YQS=YB−RA)≤YB−M1/2+FHD−0.2 mm, can achieve that after the square PCB with the MicroUSB component being surface mounted thereon is assembled with the plastic structural part, the MicroUSB interface will not interfere with the metal cap, otherwise a charging cable may not be connected.

FIG. 10 is a structure diagram showing relative positions of the metal cap 1, the circular PCB, and the square PCB after assembly in the embodiment, wherein a key dimension is UD, which represents the distance from the plane at the outermost end of the opening portion of the MicroUSB interface to the plane at the nearest edge of the first square flat plate tensile body of the square rigid FR-4 substrate, which dimension is set to 0.70 mm in the embodiment, and the setting of UD can achieve that the open end of the MicroUSB interface projects into the corresponding hollowed MicroUSB opening portion of the first tensile body of the plastic structural part, and does not exceed the outermost plane of the first tensile body of the plastic structural part, thus achieving good assembly and positioning of MicroUSB interface and plastic structural part.

The maximum height DXGmax of the lithium-ion cell in the embodiment satisfies: DXGmax (=43 mm)≤H−H1−SJ1−SJ2−YH−FH2−GKDH (=50.5−1.5−0.8−2.2−0.6−1.5−0.5=43.4 mm), wherein H is the total height of the secondary lithium-ion battery, H1 is the height of the first cylindrical body of the metal cap, SJ1 is the height of the first tensile body of the plastic structural part, SJ2 is the height of the second tensile body of the plastic structural part, YH is the thickness of the circular rigid FR-4 substrate, FH2 is the height of the second square flat plate tensile body of the square rigid FR-4 substrate, and GKDH is the thickness of the bottom of the steel shell including the convex plate at the bottom.

Figure 11:
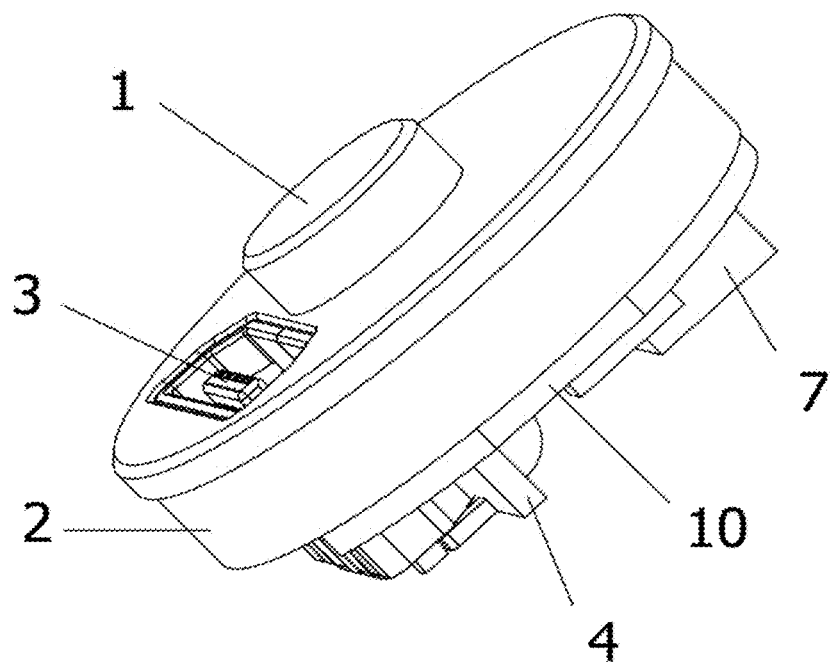
FIG. 11 is an assembly structure diagram of the plastic structural part, the metal cap, the circular PCB, and the square PCB in embodiment 1.

FIG. 11 is a structure diagram showing relative positions of the plastic structural part, the metal cap, the circular PCB, and the square PCB after assembly in the embodiment.

Figure 12:
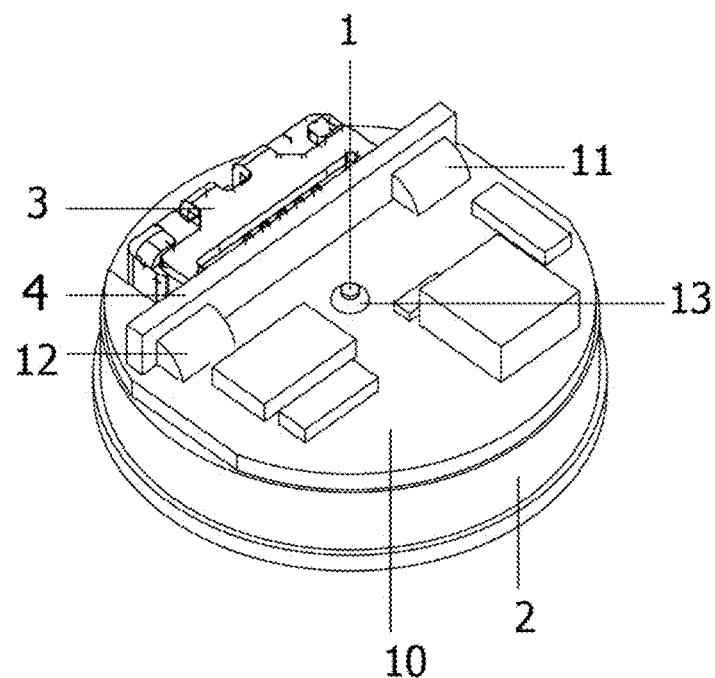
FIG. 12 is a structure diagram illustrating soldered fixation of the metal cap, the circular PCB, and the square PCB in embodiment 1.

FIG. 12 is a structure diagram illustrating soldered fixation of the plastic structural part, the metal cap, the circular PCB, and the square PCB in the embodiment. The metal cap 1 is connected and fixed to the circular PCB through a third soldering area 13, and the third soldering area 13 is at the position of the third port J3 of the side B of the circular rigid FR-4 substrate 10, and achieves connection and fixation by soldering a pad at the port J3 to the third cylindrical body of the metal cap 1. The square PCB and the circular PCB are connected and fixed through a first soldering area 11 and a second soldering area 12. The first solder pad 11 is at the position of the seventh port J7 of the side B of the circular rigid FR-4 substrate 10, and at the position of the sixth port J6 of the side B of the square rigid FR-4 substrate 4, and achieves connection and fixation by soldering a pad at the port J7 to a pad at the port J6. The second soldering area 12 is at the position of the forth port J4 of the side B of the circular rigid FR-4 substrate 10, and at the position of the fifth port J5 of the side B of the square rigid FR-4 substrate 4, and achieves connection and fixation by soldering a pad at the port J4 to a pad at the port J5. The first soldering area 11 and the second soldering area 12 are both arranged on the side B of the square rigid FR-4 substrate 4, and avoids the MicroUSB interface 3 of the metal shell, thereby greatly reducing the difficulty of soldering and also reducing the risk of a short circuit of the first the soldering area 11 and the second soldering area 12 through a casing of the MicroUSB interface 3.

Referring to FIGS. 1 to 12, in the actual fabrication of the embodiment, the following steps are carried out:

(1) A metal cap is mounted into a plastic structural part, with a first cylindrical body of the metal cap being clamped on an end face of a first tensile body of the plastic structural part, and second and third cylindrical bodies of the metal cap being inserted into a center hole of the plastic structural part and projecting into an internal cavity of a second tensile body of the plastic structural part.

(2) With a side A of a circular PCB facing upward, and a side A of the square PCB facing outward, a side B of the square PCB is perpendicularly assembled with the circular PCB, an opening of a MicroUSB interface being oriented the same as the side A of the circular PCB, and their assembly being performed in a clamped manner through a notch of a square flat plate tensile body of the circular PCB and square slots of the square PCB, to form a PCB assembly.

(3) The PCB assembly is assembled with the plastic structural part installed with the metal cap, such that the MicroUSB interface is clamped into a hollowed MicroUSB opening portion of the plastic structural part along an opening direction, and the third cylindrical body of the metal cap is inserted into a center hole of the circular PCB, as shown in FIG. 11.

(4) Soldered connection and fixation is carried out between a side B of the circular PCB and the side B of the square PCB, and between the side B of the circular PCB and the metal cap, that is, a fourth pad of the side B of the circular PCB is soldered to a fifth pad of the side B of the square PCB, a seventh pad of the side B of the circular PCB is soldered to a sixth pad of the side B of the square PCB, and a third pad of the side B of the circular PCB is soldered to the third cylindrical tensile body of the metal cap, as shown in FIG. 12.

(5) A positive electrode lead wire (which may be a nickel strip, a nickel-plated steel strip, or a conducting wire) is welded at a positive terminal of a lithium-ion cell, and a negative electrode lead wire (which may be a nickel strip or a nickel-plated steel strip) is welded at a negative terminal of the lithium-ion cell, and then the lithium-ion cell is placed into a steel shell, and the negative electrode lead wire of the lithium-ion cell is electrically connected to the steel shell (by soldering, press-fitting, electric resistance welding, laser welding, or the like).

(6) The positive electrode lead wire of the lithium-ion cell is connected to a first pad of the side B of the circular PCB (if the positive electrode lead wire of the lithium-ion cell is a conducting wire or a nickel strip or a nickel-plated steel strip, soldering connection can be adopted; and if the positive electrode lead wire of the lithium-ion cell is a nickel strip or a nickel-plated steel strip, it's possible that the nickel sheet or the nickel-plated steel sheet is surface mounted to the first pad on the side B of the circular PCB, and then, the positive electrode lead wire of the lithium-ion cell is connected to the first pad of the side B of the circular PCB by resistance welding or laser welding); and the negative electrode lead wire of the lithium-ion cell is connected to a second pad on the side B of the circular PCB, in which soldering connection can be adopted, and it's also possible that a nickel sheet or a nickel-plated steel sheet is surface mounted to the second pad on the side B of the circular PCB, and then, the negative electrode lead wire of the lithium-ion cell is connected to the second pad of the side B of the circular PCB by resistance welding or laser welding.

(7) The second tensile body of the plastic structural part is inserted into the steel shell, and then a joint part of the second tensile body of the plastic structural part and the steel shell is punched by a steel pin, and the steel shell is deformed under force and embedded into the second tensile body of the plastic structural part, thus achieving fixation of the plastic structural part and the steel shell.

In this way, the fabrication of the high-energy-density cylindrical secondary lithium-ion battery integrating multiple functions of charge management, constant voltage output, charge and discharge protection, and having a McirоUSB interface is accomplished.

Figure 13:
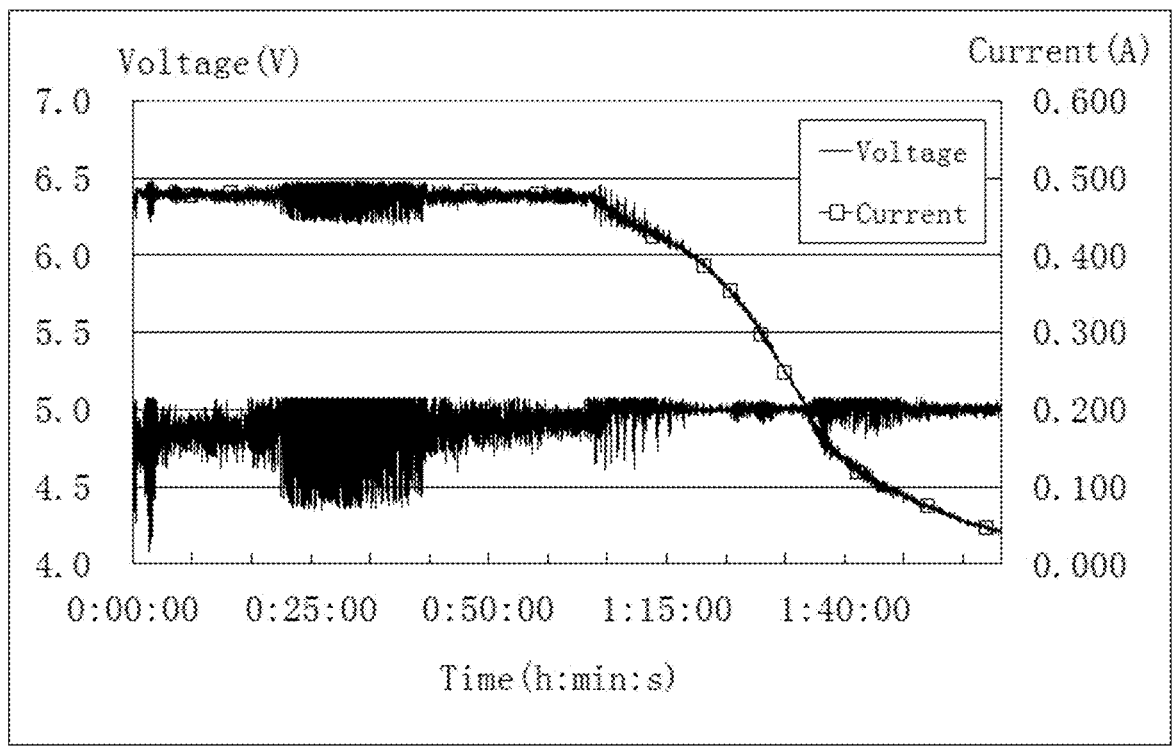
FIG. 13 is a discharge voltage-discharge current-discharge time relationship diagram of the secondary lithium-ion battery in embodiment 1.

After the secondary lithium-ion battery in the embodiment is completely discharged, the adapter specification is: a constant voltage output of 5V, and a maximum charge current of 500 mA, for charging the battery through the McироUSB interface, the total charge capacity being 753.2 mAh, and its charge voltage-charge current-charge time relationship diagram is shown in FIG. 13. During the charge process, charge management and charge protection are carried out by the circuitry inside the battery.

Figure 14:
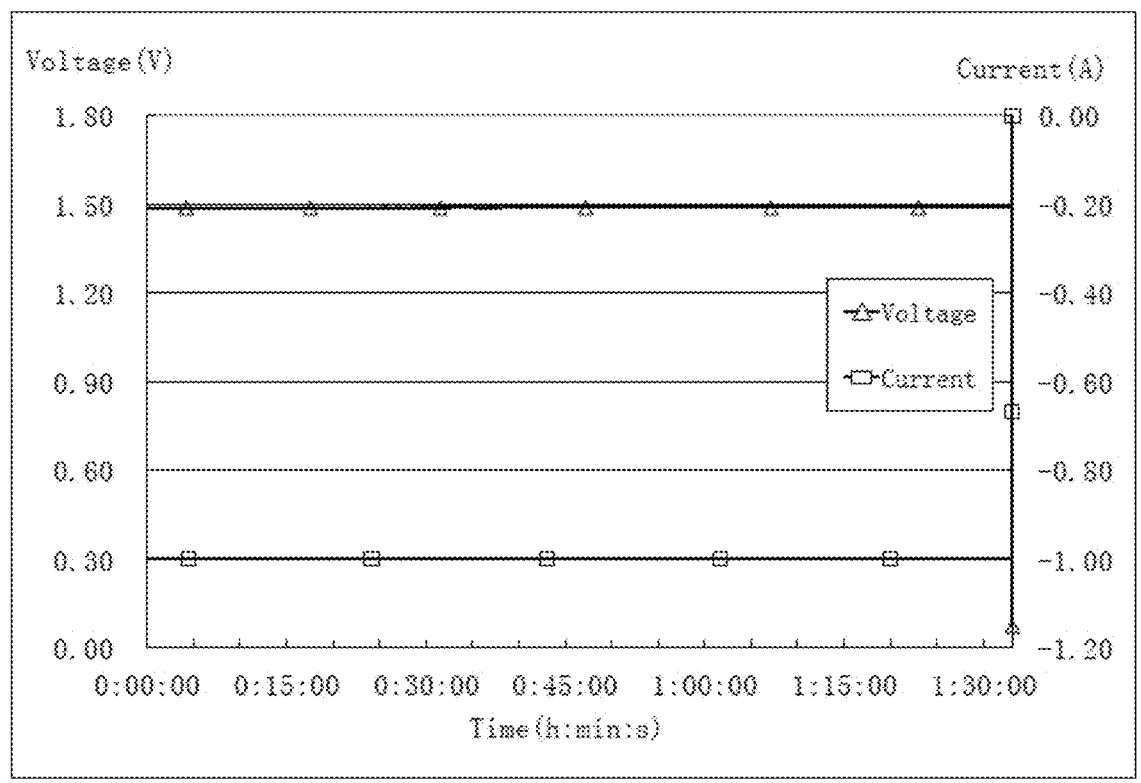
FIG. 14 is a charge voltage-charge current-charge time relationship diagram of the secondary lithium-ion battery in embodiment 1.

The fully charged battery is discharged at a constant current of 1000 mA, with a cut-off voltage of 1.0V. Its discharge voltage-discharge current-time relationship diagram is shown in FIG. 14, wherein the discharge voltage of the battery is 1503 mV to 1488 mV, stable within the range of 1.55±0.10V, thereby achieving the function of a constant voltage output with a current of 1.0 A, and the discharge capacity of the whole discharge process is 1552 mAh. At the end of the discharge, the discharge voltage suddenly drops to 0.07V, and the current is 0 mA, indicating that an overdischarge protection condition is triggered, and the discharge circuit is turned off, thus achieving the discharge protection function.

In a method of the prior art, for a battery with the size of the same model, i.e. model R6S, as structural parts occupy more than a space of about 8 mm height in the embodiment, it can only use a polymer lithium-ion battery with a smaller height, generally of the model 13350 (with a diameter of 13.00±0.20 mm, and a height of $35.00^{+0}_{-1.0}$ mm), with a nominal voltage of 3.7V, and a capacity of 550 mAh. That is, the technical method of the embodiment can achieve an energy density of 36% higher than the prior art.

It should be noted that although the embodiment is described by using a lithium-ion battery with a constant step-down voltage output of 1.55V as an example, it's also applicable to a working condition in which a battery needs a constant step-up voltage output, for example, a lithium-ion battery with a constant voltage output of 9V, etc.

It should be noted that although the embodiment is described with the size of the model R6S, it's also applicable to batteries of other sizes.

Embodiment 2

A high-energy-density secondary lithium-ion battery has a structure similar to that of the high-energy-density secondary lithium-ion battery of embodiment 1, with differences in that a constant output voltage is 1.32V and the specification of a first resistor R1 is 120K±1%, and the specification of a second resistor R2 is 100K±1%.

Described above are preferred embodiments of the present invention, and it should be noted that to those of ordinary skill in the art, a number of improvements and modifications may also be made without departing from principles of the present invention, and these improvements and modifications should also be encompassed within the protection scope of the present invention.

The invention claimed is:

1. A high-energy-density secondary lithium-ion battery, comprising: a lithium-ion cell, a steel shell, a protection IC, an integrated IC, resistors, capacitors, an inductor, a MicroUSB interface, a plastic structural part, a square rigid FR-4 substrate, a circular rigid FR-4 substrate and a metal cap, for integrating three functions of a constant voltage output, charge management and protection, overcharge and overdischarge protection, overcurrent protection and in a form of three-dimensional space layout and assembly, greatly reducing the space occupied by structural parts that do not contribute to the capacity, to achieve a high energy density, wherein the MicroUSB interface is welded to a side A of the square rigid FR-4 substrate; the protection IC, the integrated IC, the resistors, the capacitors, the inductor and the metal cap are welded to the circular rigid FR-4 substrate; a side B of the square rigid FR-4 substrate is perpendicularly assembled with the circular rigid FR-4 substrate, an opening of the MicroUSB interface being oriented the same as a side A of the circular rigid FR-4 substrate, and pads on the side B of the square rigid FR-4 are soldered and fixed to pads on a side B of the circular rigid FR-4 substrate; the lithium-ion cell is placed inside the steel shell; the metal cap is clamped in the plastic structural part and partially exposed from an end face of a first tensile body of the plastic structural part; the square rigid FR-4 substrate and the circular rigid FR-4 substrate assembled together are clamped on the plastic structural part in a mating manner with the opening of the MicroUSB interface facing upward; the plastic structural part is sleeved at an open end of the steel shell in a mating manner; and a positive terminal and a negative terminal of the lithium-ion cell are connected to a first pad and a second pad on the side B of the circular rigid FR-4 substrate through a positive electrode lead wire and a negative electrode lead wire respectively;

the metal cap satisfies: SJ1+Yjmax ≤H2, SJ1+SJ2−0.8 mm≤H2≤SJ1+SJ2−0.2 mm, YH+0.2 mm≤H3≤YH+2 mm, and YH+SJ1+SJ2≤H3+H2≤YH+SJ1+SJ2+2 mm, wherein SJ1 is the height of the first tensile body of the plastic structural part, YJmax is the height of a highest component on the side A of the circular rigid FR-4 substrate, that is, the side directly facing a first cylindrical body of the metal cap, SJ2 is the height of a second tensile body of the plastic structural part, H2 is the height of a second cylindrical body of the metal cap, H3 is the height of a third cylindrical body of the metal cap, and YH is the thickness of the circular rigid FR-4 substrate, all in mm;

the plastic structural part satisfies: M2<SHD<M1, and YJmax<SJ2<YJmax+1 mm, wherein M1 is the diameter of the first cylindrical body of the metal cap, M2 is the diameter of the second cylindrical body of the metal cap, SHD is the diameter of a central hole of the plastic structural part, SJ2 is the height of the second tensile body of the plastic structural part, and YJmax is the height of the highest component on the side A of the circular rigid FR-4 substrate, that is, the side directly facing the first cylindrical body of the metal cap, all in mm;

the square rigid FR-4 substrate satisfies: SJ1≤FH1, UH−UD−FCG≤FH1+FH2≤UH−UD−FCG+1 mm, and YPmax≤FH2, wherein SJ1 is the height of the first tensile body of the plastic structural part, FH1 is the height of a first square flat plate tensile body of the square rigid FR-4 substrate, FH2 is the height of a second square flat plate tensile body of the square rigid FR-4 substrate, UH is the length of the MicroUSB interface, UD is the distance from the plane of an outermost end of an opening portion of the MicroUSB interface to the plane of a nearest edge of the first square flat plate tensile body of the square rigid FR-4 substrate, FCG is the height of a square slot of the square rigid FR-4 substrate, and YPmax is the height of the highest component on the side B of the circular rigid FR-4 substrate, all in mm;

the circular rigid FR-4 substrate satisfies:

$$\left(\frac{SD2}{2} - SDB\right) - \sqrt{\left(\frac{SD2}{2} - SDB\right)^2 - \left(\frac{UA}{2}\right)^2} + UF - FHD \le$$

$$YQS \le YB - M1/2 + FHD - 0.2 \text{ mm, and } YQS = YB - RA,$$

wherein YQS is the depth of a notch of a square flat plate tensile body of the circular rigid FR-4 substrate, UF is the thickness of the MicroUSB interface, SD2 is the outer diameter of the second tensile body of the plastic structural part, SDB is the wall thickness of the second tensile body of the plastic structural part, UA is the width of the MicroUSB interface, YB is the radius of the circular rigid FR-4 substrate, RA is the closest distance from the circle center of the circular rigid FR-4 substrate to the square flat plate tensile body notch of the circular rigid FR-4 substrate, FHD is the thickness of the square rigid FR-4 substrate, and M1 is the diameter of the first cylindrical body of the metal cap, all in mm; and the maximum height DXGmax of the lithium-ion cell satisfies: DXGmax≤H−H1−SJ1−SJ2−YH−FH2−GKDH, wherein H is the total height of the secondary lithium-ion battery, H1 is the height of the first cylindrical body of the metal cap, SJ1 is the height of the first tensile body of the plastic structural part, SJ2 is the height of the second tensile body of the plastic structural part, YH is the thickness of the circular rigid FR-4 substrate, FH2 is the height of the second square flat plate tensile body of the square rigid FR-4 substrate, and GKDH is the thickness of the bottom of the steel shell including a convex plate at the bottom, all in mm.

2. The high-energy-density secondary lithium-ion battery of claim 1, wherein the metal cap satisfies M2<M1<SD1, 0.5 mm≤M2≤3 mm, M3<M2, and 0.1 mm≤M3≤1 mm, wherein M1 is the diameter of the first cylindrical body of the metal cap, M2 is the diameter of the second cylindrical body of the metal cap, M3 is the diameter of the third cylindrical body of the metal cap, and SD1 is the diameter of the first tensile body of the plastic structural part.

3. The high-energy-density secondary lithium-ion battery of claim 1, wherein the plastic structural part satisfies: SD1=GW, 0.5 mm≤SJ1≤1 mm, GN−0.5 mm≤SD2≤GN, and 0.5 mm≤SDB≤1 mm, wherein SD1 is the diameter of the first tensile body of the plastic structural part, GW is the outer diameter of the steel shell, SJ1 is the height of the first tensile body of the plastic structural part, SD2 is the outer diameter of the second tensile body of the plastic structural part, GN is the inner diameter of the steel shell, and SDB is the wall thickness of the second tensile body of the plastic structural part, all in mm.

4. The high-energy-density secondary lithium-ion battery of claim 1, wherein the square rigid FR-4 substrate satisfies: YH<FCG≤YH+0.2 mm, 0.5 mm≤FCKD≤2 mm, UA+2 mm≤FK1≤UA+5 mm, FK1<FK2, $2 \times \sqrt{YB^2 - RA^2} - 2$ mm≤FK2≤$2 \times \sqrt{YB^2 - RA^2}$, and SJ1−0.1 mm≤UD≤SJ1, wherein YH is the thickness of the circular rigid FR-4 substrate, FCG is the height of the square slot of the square rigid FR-4 substrate, FCKD is the width of the square slot of the square rigid FR-4 substrate, UA is the width of the MicroUSB interface, FK1 is the width of the first square flat plate tensile body of the square rigid FR-4 substrate, FK2 is the width of the second square flat plate tensile body of the square rigid FR-4 substrate, YB is the radius of the circular rigid FR-4 substrate, RA is the closest distance from the circle center of the circular rigid FR-4 substrate to the square flat plate tensile body notch of the circular rigid FR-4 substrate, SJ1 is the height of the first tensile body of the plastic structural part, and UD is the distance from the plane of the outermost end of the opening portion of the MicroUSB interface to the plane of the nearest edge of the first square flat plate tensile body of the square rigid FR-4 substrate, all in mm.

5. The high-energy-density secondary lithium-ion battery of claim 1, wherein the circular rigid FR-4 substrate satisfies: M3≤d1≤M3+0.3 mm, SD2−SDB×2<2×YB<SD2, and FK1−2×FCKD≤YQK≤FK1−1.0 mm, wherein YB is the radius of the circular rigid FR-4 substrate, d1 is the diameter of the center hole of the circular rigid FR-4 substrate, M3 is the diameter of the third cylindrical body of the metal cap, SD2 is the outer diameter of the second tensile body of the plastic structural part, SDB is the wall thickness of the second tensile body of the plastic structural part, YQK is the width of the square flat plate tensile body notch of the circular rigid FR-4 substrate, FK1 is the width of the first square flat plate tensile body of the square rigid FR-4 substrate, and FCKD is the width of the square slot of the square rigid FR-4 substrate, all in mm.

6. The high-energy-density secondary lithium-ion battery of claim 2, wherein the metal cap comprises the first cylindrical body, the second cylindrical body and the third cylindrical body, an upper end face of the first cylindrical body being chamfered, the first cylindrical body being a structural part for the secondary lithium-ion battery to contact an external load or charging power source, the third cylindrical body, the second cylindrical body and the first cylindrical body being coaxial, a top surface of the second cylindrical body being coplanar with a bottom surface of the first cylindrical body, and a top surface of the third cylindrical body being coplanar with a bottom surface of the second cylindrical body.

7. The high-energy-density secondary lithium-ion battery of claim 3, wherein the plastic structural part comprises the first tensile body and the second tensile body, the first tensile body being a cylindrical structure, the first tensile body being provided with the center hole and a MicroUSB opening portion, the second tensile body being a cylindrical structure, one end of the second tensile body being perpendicularly fixed to the bottom of the first tensile body, and the second tensile body being coaxial with the first tensile body.

8. The high-energy-density secondary lithium-ion battery of claim 4, wherein the square rigid FR-4 substrate comprises the first square flat plate tensile body and the second square flat plate tensile body, the first square flat plate tensile body being combined with the second square flat plate tensile body into a whole, and two hollowed square slots symmetrical about a central axis being formed at a joint part of the first square flat plate tensile body and the second square flat plate tensile body.

9. The high-energy-density secondary lithium-ion battery of claim 1, wherein the overall contour of the circular rigid FR-4 substrate is a circular tensile body, and the circular rigid FR-4 substrate is provided with a square flat plate tensile body notch and a center hole.

* * * * *